(12) United States Patent
Spinelli et al.

(10) Patent No.: US 11,769,091 B1
(45) Date of Patent: *Sep. 26, 2023

(54) CONSTRUCTION MATERIAL QUANTITY CERTIFICATION SYSTEM WITH LIFE CYCLE CHAIN OF CUSTODY CAPABILITY

(71) Applicant: Haul Hub Inc., Haverhill, MA (US)

(72) Inventors: Joseph Spinelli, Harvard, MA (US); Corey Paradis, Dover, NH (US); Varadarajan Parthasarathi, Austin, TX (US); Matthew Valle, Concord, NH (US); Prajyot Bankade, Stow, MA (US); Dhaval Patel, Roselle Park, NJ (US)

(73) Assignee: Haul Hub Inc., Haverhill, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,455

(22) Filed: Jul. 11, 2022

Related U.S. Application Data

(63) Continuation of application No. 17/720,639, filed on Apr. 14, 2022, now Pat. No. 11,461,716.

(51) Int. Cl.
*G06Q 10/06* (2023.01)
*G06Q 10/0631* (2023.01)
*G06Q 50/08* (2012.01)

(52) U.S. Cl.
CPC ....... *G06Q 10/06313* (2013.01); *G06Q 50/08* (2013.01)

(58) Field of Classification Search
None
See application file for complete search history.

(56) References Cited

U.S. PATENT DOCUMENTS 595,206 A 12/1897 Quick
5,189,606 A 2/1993 Burns et al.
(Continued)

OTHER PUBLICATIONS

Alam et al. (S. Alam, M. Chowdhury and S. Rasel, "Digital Mail: An User Demand and Verification-aware Mobile Application Featuring Parcel Delivery for the Bangladeshi Postal Services," 2022 International Conference on Advancement in Electrical and Electronic Engineering (ICAEEE), 2022, pp. 1-6, doi: 10.1109/ICAEEE.*

(Continued)

*Primary Examiner* — Matthew D Henry
(74) *Attorney, Agent, or Firm* — Sunstein LLP

(57) ABSTRACT

A construction material quantity certification system includes first and second electronic databases that store construction project data and contractor data, as well as data about a plurality of deliveries of construction materials, including source records that identify sources of the delivered construction materials and chain of custody data. A server is coupled to plurality of devices, such as vehicle weight scales, configured to provide data about respective quantities of construction materials loaded onto respective vehicles. The server automatically obtains data about the respective quantities of construction materials from the plurality of devices, stores the data in the second database, associates each delivery to an associated contractor and to an associated project, updates the chain of custody data and, in response to receipt of a user input, uses data in the databases to automatically store a construction material quantity certification traceable to the source records of construction materials.

15 Claims, 14 Drawing Sheets

(56) References Cited

U.S. PATENT DOCUMENTS

| | | | |
|---|---|---|---|
| 8,191,053 B2* | 5/2012 | Grimaldi | G06F 8/52 |
| | | | 717/136 |
| 8,244,606 B2 | 8/2012 | Allin et al. | |
| 8,463,636 B2* | 6/2013 | Ahsan | G06Q 10/06 |
| | | | 705/7.14 |
| 9,336,542 B2 | 5/2016 | Allin et al. | |
| 10,225,688 B2 | 3/2019 | Skomra et al. | |
| 10,634,547 B1 | 4/2020 | Honig et al. | |
| 2005/0171692 A1 | 8/2005 | Hamblen et al. | |
| 2007/0255497 A1 | 11/2007 | Harms et al. | |
| 2009/0174768 A1 | 7/2009 | Blackburn et al. | |
| 2009/0221884 A1 | 9/2009 | Ryan | |
| 2011/0253779 A1 | 10/2011 | Mayers et al. | |
| 2013/0290062 A1 | 10/2013 | Patel et al. | |
| 2014/0006305 A1* | 1/2014 | Hetzer | G06Q 10/10 |
| | | | 705/345 |
| 2014/0099165 A1 | 4/2014 | Smieja | |
| 2016/0071033 A1 | 3/2016 | Davis et al. | |
| 2016/0379165 A1 | 12/2016 | Moakley | |
| 2018/0046981 A1 | 2/2018 | Honig et al. | |
| 2018/0186571 A1 | 7/2018 | Shimizu et al. | |
| 2018/0338293 A1 | 11/2018 | Pisharody et al. | |
| 2019/0130417 A1 | 5/2019 | Watt et al. | |
| 2019/0215163 A1 | 7/2019 | Suleiman et al. | |
| 2019/0230504 A1 | 7/2019 | Ierullo | |
| 2020/0169973 A1 | 5/2020 | Pisharody et al. | |
| 2020/0202465 A1 | 6/2020 | Massover et al. | |
| 2020/0388043 A1 | 12/2020 | Nemoto et al. | |
| 2020/0400487 A1 | 12/2020 | Honig et al. | |
| 2020/0410449 A1* | 12/2020 | Blackburn | G06Q 50/08 |
| 2021/0035383 A1* | 2/2021 | Blackburn | G06Q 10/0875 |
| 2021/0073694 A1* | 3/2021 | Yellin | G06Q 10/06313 |

OTHER PUBLICATIONS

*Delivery note QR code—Impact Mobile—Precast Concrete software*, https://www.youtube.com/watch?v=jxUWX_80i7A, Mar. 1, 2019, 1 page screenshot.

StruSoft/Impact Production, https://strusoft.com/precast/software/impact/mobile, 6 pages, Sep. 26, 2020.

*Four Concrete Solutions to Consider During the Age of COVID-19*, https://www.materialsthatperform.com/four-concrete-solutions-consider-during-age-covid-19, Jun. 15, 2020, 3 pages.

ConcreteDirect—Apps on Google Play, https://play.google.com/store/apps/details?id=com.rsm.k.customer&hl=en_US&gl=US, best estimate Apr. 20, 2021, 3 pages.

Dufferin E-Ticketing, Specialty Construction Applications Project Brochure, 2020, 3 pages.

Customer Case Studies—The Performance Platform for Heavy Construction, Haul Hub Technologies, Apr. 16, 2020, 10 pages.

TMS Tickets, Bulk/Short Hauling Tickets, https://tms-tickets.com/?gclid=CjwKCAjw07qDBhBxEiwA6pPbHU55NVfhU1cdsXKjQeVSesAoq4-IJITOMjoCq—Ae4PAG7JHWSnR_xoCx2IQAvD_BwE, 2020, 5 pages.

TicketWatch Load & Haul Dump Truck Software web page, https://www.ticketwatch.net/industries.html, Jan. 24, 2021, 12 pages.

HCSS Trucking Ticket Management Software web page, https://www.hcss.com/products/construction-truck-ticket-management, Apr. 13, 2019, 5 pages.

HCSS Trucking Ticket Management Software web page, https://www.hcss.com/products/construction-truck-ticket-management, 2021, 5 pages.

LoadTraxx Shorthaul Load Tracking and Billing Automation web page—https://loadtraxx.com, Jun. 3, 2019, 3 pages.

LoadTraxx Shorthaul Load Tracking and Billing Automation web page—https://loadtraxx.com, 2021, 7 pages.

EFFC / DFI Carbon Calculator, European Federation of Foundation Contractors, 2021, 2021, 2 pages.

PennDOT—eTicketing Application, Apple App Store, Version 1: Sep. 11, 2021, https://apps.apple.com/us/app/penndot-eticketing/id1585228986, retrieved Apr. 29, 2022, 6 pages.

HaulHub DOTslip, Apple App Store, Version 1.5.1: Jan. 7, 2021, https://apps.apple.com/us/app/dotslip/id1485480149, Retrieved Apr. 29, 2022, 7 pages.

Alam et al., "Digital Mail: An User Demand and Verification-aware Mobile Application Featuring Parcel Delivery for the Bangladeshi Postal Services," 2022 International Conference on Advancement in Electrical and Electronic Engineering (ICAEEE), 2022, pp. 1-6, doi: 10.1109/ICAEEE.

USPTO, Non-Final Office Action issued in U.S. Appl. No. 17/958,985, dated Jan. 18, 2023, 35 pages.

European Patent Office, International Search Report and Written Opinion for PCT application No. PCT/US2022/047121, dated Jan. 27, 2023, 20 pages.

Charles Rathmann, "How Construction Telematics Data is Driving Returns Across the Business", Aug. 25, 2022, 5 pages (https://www.forconstructionpros.com/profit-matters/article/22340070/construction-telematics-data-matures-as-a-business-tool).

* cited by examiner

FIG. 13

← SR-72, McCoy Road to SR-71
36% Complete (1,450 Tons / 4,503 Tons)
Reconciliation  Tickets  Team  Settings Under Construction ▼ | State Project #: HSIPX-I50-2(29)--3L-06  Application Date: April 31 2021 | Close Pay Period | ← Pay Period 3 → | Jul 1 2022 - Jul 31 2021 ✎

| Pilot Car 19.1% | Field Office 26% | Flagger 19.1% |
|---|---|---|
| Base Widening 67% | Handwork 98% | Mulch 108% |

670 of 1,202 Tons  67%

Edit Pay Period

‹ July 2021 ›
S  M  T  W  T  F  S
27 28 29 30 31  1  2
(3) 4  5  6  7  8  9
10 11 12 13 14 15 16
17 18 19 20 21 22 23
24 25 26 27 28 29 30

Apply Changes

Pay Codes

| LINE | ITEMS NO | DESCRIPTION | ESTIMATED QTY | WORK COMPLETED Previous Period | WORK COMPLETED This Period | TTL TO DATE | BALANCE TO FINISH |
|---|---|---|---|---|---|---|---|
| 1 | 4263463466 | M1, M2 | 5,452 | 2,200 | 2,200 | 1,000 | 1,503 |
| 2 | 4263463466 | M1, M2 | 5,452 | 2,200 | 2,200 | 1,000 | 1,503 |
| 3 | 4263463466 | M1, M2 | 5,452 | 2,200 | 2,200 | 1,000 | 1,503 |
| 4 | 4263463466 | M1, M2 | 5,452 | 2,200 | 2,200 | 1,000 | 1,503 |
| 5 | 4263463466 | M1, M2 | 5,452 | 2,200 | 2,200 | 1,000 | 1,503 |

All Tickets (2,346) | Uncoded (2603) | Coded (283) | Assign Pay Codes | Download Slips

| SUPPLIER | PLANT | TICKET | DATE | MATERIAL | PROJECT | TRUCK | LOAD NUMBER | STATUS |
|---|---|---|---|---|---|---|---|---|
| QRS & Bro... | Anytown... | 395237602 | 2021-11-10... | QCQA-HMA 3 70... | SR 13 / SR 15... | SMG515 | 1,503 | Pending |
| QRS & Bro... | Anytown... | 395237602 | 2021-11-10... | QCQA-HMA 3 70... | SR 13 / SR 15... | SMG515 | 1,503 | Pending |
| QRS & Bro... | Anytown... | 395237602 | 2021-11-10... | QCQA-HMA 3 70... | SR 13 / SR 15... | SMG515 | 1,503 | Pending |
| QRS & Bro... | Anytown... | 395237602 | 2021-11-10... | QCQA-HMA 3 70... | SR 13 / SR 15... | SMG515 | 1,503 | Pending |

FIG. 14

← SR-72, McCoy Road to SR-71
36% Complete (1,450 Tons / 4,503 Tons)
Reconciliation  Tickets  Team  Settings State Project #: HSIPX-150-2(29)--3L-06  Application Date: April 31 2021

| | | | | 653 | 132 Active > |

← Pay Period 3 → Jul 1 2022 - Jul 31 2021

| Base Widening 67% | Pilot Car 19.1% | Field Office 26% | Flagger 19.1% | Mobilization 80% | Seed + Fertilize 75% |
| | Handwork 98% | | Mulch 108% | Traffic Control 52% | Painted Symbol 112.6% |

670 of 1,202 Tons          67%

Close Pay Period                                                    ✕

Pay Period: 3   Start Date: Jul 31   Start Date: Jul 31
              2022, 02:00 PM EST   2021, 05:20 PM EST  ✎  Coded Tickets: 452  Uncoded Tickets: 23

There are 23 uncoded tickets ded tickets to a pay item

Once you close the pa osed pay period.

Edit Pay Period End Time

Time  [11:11] [AM] [PM]

Edit Date  Cancel  Done                    Cancel   Close Pay Period

| | | | 2,200 | 1,000 | 1,503 |
| 4 | | | | | |
| 5 | 4263463466 | M1,M2 | 5,452 | 2,200 | 1,000 | 1,503 |

Contract Items Breakdown

🔍  Status  Item #  Material                                                     Menu
                                                                                Export Paycodes

| LINE | ITEMS NO ☐ | DESCRIPTION ☐ | ESTIMATED QTY ☐ | WORK COMPLETED ☐ Previous Period  This Period | TOTAL STORED TO DATE ☐ | FINISH |
|---|---|---|---|---|---|---|
| 1 | 4263463466 | M1,M2 | 5,452 | 2,200 | 1,000 | 1,000 | 1,503 |
| 2 | 4263463466 | M1,M2 | 5,452 | 2,200 | 1,000 | 1,000 | 1,503 |
| 3 | 4263463466 | M1,M2 | 5,452 | 2,200 | 1,000 | 1,000 | 1,503 |

CONSTRUCTION MATERIAL QUANTITY CERTIFICATION SYSTEM WITH LIFE CYCLE CHAIN OF CUSTODY CAPABILITY

CROSS REFERENCE TO RELATED APPLICATIONS

This application is a continuation-in-part of U.S. patent application Ser. No. 17/720,639, filed Apr. 14, 2022, titled "Construction Source Record and Project Reconciliation System with Life Cycle Chain of Custody Capability," the entire contents of which are hereby incorporated by reference herein, for all purposes.

BACKGROUND

Technical Field

The invention relates to a construction material quantity certification system, and more particularly to such a system capable of backing quantity certifications and/or payment processes with source records and associated chain of custody information throughout the life cycle of a project and across all parties involved in the project.

Background

Large construction projects, such as highways, bridges, airports, and buildings, typically involve many parties, each with its own way of representing and storing data related to a project. For example, a state department of transportation (DOT) may use an electronic database to store project plans, identities of assigned employees, and a list of contractors working on each project. Each project may involve many contractors, such as pavers, steel erectors, and construction debris haulers. Each contractor on a given project may have its own paper or electronic database to keep track of hauls of construction materials to or from various construction sites.

The contractors typically obtain construction materials, such as ready-mix concrete, aggregates, structural steel beams, hot-mix asphalt ("HMA"), timber, salt, etc., from suppliers, and sometimes contractors engage subcontractors to perform some tasks and/or to provide or haul some construction materials. Each of these suppliers and subcontractors may have its own paper or electronic database for keeping track of construction materials supplied or hauled to or from construction sites.

A project owner, such as a DOT, typically requires source documentation of construction materials delivered to construction sites. The source documentation must be created at a point of origin of the construction material, adequately describe type and quantity of construction material delivered, and meet other requirements. Source documentation requirements are particularly stringent for federally funded projects. Exemplary federal rules regarding source documentation may be found in in 23 CFR 635.123 ("Determination and documentation of pay quantities") and 2 CFR 200 ("Uniform Administrative Requirements, Cost Principles, and Audit Requirements for Federal Awards").

A contractor must fulfil these requirements before a project owner will pay the contractor for construction materials delivered to a construction site. The contractor is then responsible for paying his supplier and/or subcontractor. However, even if all the parties involved maintain electronic databases, these databases are independently developed and incompatible with each other. These incompatibilities require manual intervention to facilitate a meaningful exchange of information and payment for delivered construction materials.

For example, each haul of construction material from a supplier to a construction site is accompanied by a "haul ticket," which lists the supplier, type and quantity of construction material being hauled, contractor who ordered the construction material, etc. However, not all suppliers use a consistent nomenclature. One supplier may refer to a given contractor with one name (ex. "Acme Construction Co., Inc."), whereas another supplier may refer to the same contractor with a different name (ex. "Acme" or "ACME"), each of which may be different from the way a DOT database identifies the contractor. Furthermore, some suppliers may list a project name (ex., "Main Street Bridge") or a project owner (ex. "Pennsylvania DOT"), instead of the contractor name. Similarly, different parties may refer to the same construction material using different names or designations.

Paper haul tickets containing such inconsistencies or errors can nonetheless be properly handled as a result of manual sorting of the haul tickets at construction sites by receiving inspectors who may place the haul tickets into respective boxes, each box being associated with a respective contractor. However, electronic haul tickets cannot so easily be sorted or corrected. Thus, simply digitizing haul tickets exasperates, rather than solves, the problem.

Even if these data differences can be reconciled, a project owner requires certainty that specified quantities of construction materials have been delivered, and that the delivered construction materials meet quality and other specifications, before the project owner will authorize payment for the construction materials. For federally funded projects, the United States Federal Highway Administration (FHWA) requires adequate source documentation for the delivered construction materials before the FHWA will reimburse the project owner.

Current manual and automatic processes cannot meet these requirements. For example, once a haul ticket is divided into copies, each entity (supplier, hauler, inspector, contractor, etc.) manipulates its copy of data represented by their respective copy. For example, a contractor does not have access to comments on quality or quantity that an inspector made on her copy of a load ticket. Consequently, no entity's data contains adequate source documentation or chain of custody data for the construction materials. Thus, certifying a quantity of construction material delivered to a project involves a long and complicated manual process of piecing together data from many sources.

There is, therefore, a need for a system that can automatically generate a construction material quantity certification that is traceable to source records of delivered construction materials.

SUMMARY OF EMBODIMENTS

Benefits and advantages of the present invention over existing systems will be readily apparent from the Detailed Description to follow. One skilled in the art will appreciate that the present teachings can be practiced with embodiments other than those summarized or disclosed below.

An embodiment of the present invention provides a construction material quantity certification system. The system includes a first electronic database, a second electronic database, a server, and an electronic interface to a plurality of devices. Each device is configured to provide data about respective quantities of construction materials loaded onto, or unloaded from, respective vehicles.

The first electronic database is configured to store construction project data. The construction project data includes project specification data for each of a plurality of projects. The construction project data also includes contractor data for each of a plurality of contractors engaged for ones of the projects.

The second electronic database is configured to store data about a plurality of deliveries of construction materials to respective construction sites of respective projects. For each delivery of a delivered construction material, the second database is configured to store: an identification of the delivered construction material; a source record that identifies a source of the delivered construction material; and chain of custody data about the delivered construction material and extending from the source of the delivered construction material.

The server is coupled to the electronic interface. The server is configured to automatically obtain the data about the respective quantities of construction materials from the plurality of devices. The server stores the data about the respective quantities of construction materials in the second database as the respective quantities of construction materials are obtained from respective suppliers and/or delivered to respective construction sites. The server is also configured to associate each delivery of a delivered construction material to an associated contractor and to an associated project in the project specification data of the first database. The server updates the chain of custody data about the delivered construction material.

In response to receipt of a user input via a first user interface, the server uses data in the second database about a subset of the delivered construction materials, and data in the first database about the contractor and the project associated with the subset of the delivered construction materials, to automatically store a construction material quantity certification that is traceable to a plurality of the source records of delivered construction materials.

Optionally, the server is configured to use data in the first and second electronic databases to automatically verify the respective delivered construction material complies with material specification requirements in the project specification data of the associated project. In response to a successful verification, the server stores delivery confirmation data for the delivered construction material and the associated contractor.

Optionally, the server is configured to condition storage of the construction material quantity certification on the delivery confirmation data for corresponding delivered construction material.

Optionally, the first user interface or the server is configured to store first context information about a delivery of a delivered construction material. In such an embodiment, the server is configured to use the first context information and the data in the first and second databases for the delivered construction material and the associated contractor to automatically store the construction material quantity certification.

Optionally, the first context information includes data about a plurality of quantities of construction materials. In such an embodiment, the server is configured to send the first context information to the first user interface, as the respective quantities of construction materials are obtained from respective suppliers and/or delivered to respective construction sites.

Optionally, the first context information includes data identifying a weighmaster. In such an embodiment, the server is configured to use the identity of the weighmaster to automatically identify a plurality of deliveries of construction materials that were processed by the weighmaster.

Optionally, the first user interface or the server is configured to store first context information about a plurality of deliveries of delivered construction materials. In such an embodiment, the server is configured to use the first context information and the data in the first and second databases for the delivered construction material and the associated contractor to automatically store the construction material quantity certification.

Optionally, the first user interface is configured to accept a user-entered time range. In such an embodiment, the first user interface or the server is configured to use the user-entered time range to at least partly define the plurality of deliveries of delivered construction materials.

Optionally, a second user interface is configured to receive textual information from a user about a delivery of construction material. In such an embodiment, the server is configured, in response to receipt of the textual information, to automatically store the textual information in the first or second electronic database and associate the stored textual information to an associated project.

Optionally, a second user interface is configured to receive data from a sensor about a delivery of construction material. In such an embodiment, the server is configured, in response to receipt of the data from the sensor, to automatically store the data from the sensor in the first or second electronic database and associate the stored data from the sensor to an associated project.

Optionally, the server is configured, in response to receipt of a user input via a third user interface, distinct from the first user interface, to use data in the second database about a subset of the delivered construction materials, and data in the first database about the contractor and the project associated with the subset of the delivered construction materials, to automatically store a construction material quantity certification that is traceable to a plurality of the source records of delivered construction materials.

Optionally, the server is configured, in response to receipt of a user input via a fourth user interface, distinct from the first user interface, to automatically generate and send a message requesting construction material quantity certification of the subset of the delivered construction materials.

Optionally, the server is configured, in response to receipt of a user input via the first user interface, to use data in the second database about a subset of the delivered construction materials, and data in the first database about the contractor and the project associated with the subset of the delivered construction materials, to automatically generate and store an audit of the subset of the delivered construction materials.

Optionally, at least one device of the plurality of the devices configured to provide data about respective quantities of construction materials loaded onto, or unloaded from, respective vehicles includes a weight scale.

Optionally, at least one device of the plurality of the devices configured to provide data about respective quantities of construction materials loaded onto, or unloaded from, respective vehicles includes a system configured to automatically measure effort exerted by a mechanical system to load the construction material and calculate or estimate a quantity of the construction material based at least in part on the effort exerted by the mechanical system.

Optionally, at least one device of the plurality of the devices configured to provide data about respective quantities of construction materials loaded onto, or unloaded from, respective vehicles comprises a system configured to automatically calculate or estimate a quantity of the construction material based at least in part on a predetermined volume of a bucket of a mechanical construction material loading system.

Optionally, at least one device of the plurality of the devices configured to provide data about respective quantities of construction materials loaded onto, or unloaded from, respective vehicles includes a system configured to automatically calculate or estimate a quantify of construction material being laid in a course of pavement.

Optionally, the server is configured to automatically reformat the project specification data and the contractor data into a common format.

Another embodiment of the present invention provides a database reconciliation system. The system includes a first electronic database, a first interface, a second electronic database, a server, a data reconciliation module, a comparator, and a second interface.

The first electronic database is configured to store construction project data. The construction project data includes project specification data for each of a plurality of projects, and contractor data for each of a plurality of contractors.

The first interface is configured to couple to a project owner electronic database. The first interface is configured to automatically fetch project specification data and contractor data from the project owner database and store fetched project specification data and fetched contractor data in the first database.

The second electronic database is configured to store information about a plurality of deliveries of construction materials to respective construction sites. For each delivery of a delivered construction material, the second database is configured to store: an identification of the delivered construction material; an identification of a source of the delivered construction material; and an identification of a delivery location of the delivered construction material.

The server is configured to automatically store information in the second database as respective construction materials are obtained from respective suppliers and delivered to respective delivery locations. The server is configured to automatically associate each delivery of a delivered construction material to an associated contractor.

The data reconciliation module is configured to use the information in the first and second databases to automatically associate each delivery of a delivered construction material to an associated project in the project specification data of the first database.

The comparator is configured, for each delivery of a delivered construction material, to use the information in the first and second databases to automatically verify the respective delivered construction material complies with material specification requirements in the project specification data of the associated project.

The second interface is configured, for each delivery of a delivered construction material for which the comparator verification succeeds, to automatically store delivery confirmation data for the delivered construction material and the associated contractor.

Optionally, the second interface is configured to couple to the project owner database and automatically store the delivery confirmation data in the project owner database.

Optionally, in any embodiment, the second interface is configured to automatically store the delivery confirmation data in the first database.

Optionally, in any embodiment, the second interface is configured to automatically store the delivery confirmation data in an external database.

Optionally, in any embodiment, the delivery confirmation data includes payment approval data.

Optionally, in any embodiment, the first interface is configured to automatically reformat the fetched project specification data and the fetched contractor data into a common format prior to storing the fetched project specification data and fetched contractor data in the first database.

Optionally, in any embodiment, the first interface is configured to automatically heuristically reformat the fetched project specification data and the fetched contractor data into a common format prior to storing the fetched project specification data and fetched contractor data in the first database.

Optionally, any embodiment includes a third interface. The third interface is configured to couple to an environmental impact database. The environmental impact database stores information about a plurality of construction materials. For each construction material, the environmental impact database stores: (a) an identification of the construction material and (b) an estimated environmental impact of the construction material. The third interface is configured to automatically associate (a) ones of the plurality of construction materials stored in the environmental impact database with (b1) ones of the plurality of projects stored in the first electronic database and/or (b2) ones of the plurality of deliveries of construction materials stored in the second electronic database.

Optionally, in any embodiment, the construction project data includes a computer-aided design model for each of the plurality of projects.

Optionally, in any embodiment, the construction project data includes a building information model for each of the plurality of projects Optionally, in any embodiment, the server is configured, for each delivery of a delivered construction material, to automatically receive, from a system coupled to a vehicle scale, an identification of the delivered construction material and an identification of a source of the delivered construction material. In such an embodiment, the server is configured to store, as the information in the second database, the identification of the delivered construction material and the identification of the source of the delivered construction material.

Optionally, in any embodiment, the second database is configured to maintain chain-of-custody information for each delivery of construction material of the plurality of deliveries of construction materials. In such an embodiment, the server is configured to update the chain-of-custody information, as custody of construction material in each delivery of construction material changes.

Optionally, in any embodiment, the construction project data of the first electronic database further includes supplier data for each of a plurality of suppliers.

Optionally, in any embodiment, the construction project data of the first electronic database further includes supplier data for each of a plurality of approved suppliers.

Optionally, any embodiment includes a third interface. In such an embodiment, the third interface is configured to receive a change order and, in response to receiving the change order, revise a corresponding portion of the construction project data of the first database.

Optionally, any embodiment includes an electronic rule base. In such an embodiment, the data reconciliation module is configured to use the rule base to automatically associate each delivery of a delivered construction material to an associated project in the project specification data of the first database.

Optionally, any embodiment having an electronic rule base includes an inference engine configured to automatically generate rules for the rule base. In such an embodiment, the inference engine is configured to automatically infer an association between a delivery of a delivered construction material and a project in the project specification data of the first database. The inference may be based at least in part on: proximity of the source of the delivered construction material to a construction site where the delivered construction material is delivered; and/or a match between an identification of the delivered construction material and project specification data of one project of the plurality of projects in the first database; and/or a match of a name in project specification data of one project of the plurality of projects in the first database.

Optionally, any embodiment includes an electronic rule base. In such an embodiment, the data reconciliation module is configured to use the rule base to automatically associate each delivery of a delivered construction material to an associated contractor of the plurality of contractors in the first database.

Optionally, any embodiment having an electronic rule base includes an inference engine configured to automatically generate rules for the rule base. In such an embodiment, the inference engine is configured to automatically infer an association between a delivery of a delivered construction material and a contractor of the plurality of contractors in the first database, based at least in part on: proximity of the source of the delivered construction material to a construction site where the delivered construction material is delivered; and/or a match between an identification of the delivered construction material and project specification data of one project of the plurality of projects in the first database; and/or a match of a name in project specification data of one project of the plurality of projects in the first database.

Optionally, any embodiment includes an inference engine configured to automatically infer an association between a delivery of a delivered construction material and a project in the project specification data of the first database.

Optionally, in any embodiment having an inference engine, the inference engine is configured to automatically infer the association based at least in part on: proximity of the source of the delivered construction material to a construction site where the delivered construction material is delivered; and/or a match between an identification of the delivered construction material and project specification data of one project of the plurality of projects in the first database; and/or a match of a name in project specification data of one project of the plurality of projects in the first database.

Optionally, any embodiment includes an inference engine configured to automatically infer an association between a delivery of a delivered construction material and a contractor of the plurality of contractors in the first database.

Optionally, any embodiment having an inference engine, the inference engine is configured to automatically infer the association based at least in part on: proximity of the source of the delivered construction material to a construction site where the delivered construction material is delivered; and/or a match between an identification of the delivered construction material and project specification data of one project of the plurality of projects in the first database; and/or a match of a name in project specification data of one project of the plurality of projects in the first database.

Optionally, any embodiment includes a security module configured to control access by each contractor of the plurality of contractors to individual project specification data items stored in the first database.

Optionally, in any embodiment, the first database includes a blockchain.

Optionally, in any embodiment in which the first database includes a blockchain, the blockchain is configured to reward miners of the blockchain with a cryptocurrency.

Another embodiment of the present invention provides a database. The database is configured to store construction project data. The construction project data includes project specification data for each of a plurality of projects and contractor data for each of a plurality of contractors. The specification data includes project requirements specified by respective project owners.

The database is configured to control access by each contractor of the plurality of contractors to individual project specification data items stored in the database.

The database is configured to store data indicating commitments by ones of the plurality of contractors to meet ones of the project requirements.

The database is configured to store data indicating fulfillment by ones of the plurality of contractors of ones of the commitments. Each fulfillment includes a respective delivery of construction material to a respective construction site. For each delivery of a delivered construction material, the database is configured to store: an identification of the delivered construction material; an identification of a source of the delivered construction material; and an identification of a delivery location of the delivered construction material.

Optionally, in any such database, the project specification data includes building information model (BIM) data for a respective project.

Optionally, in any such database, the database is configured to store change information in response to inputs. Each such input indicates a change to a corresponding project requirement.

Optionally, in any such database, the database includes a blockchain.

Optionally, in any such database that includes a blockchain, the blockchain is configured to reward miners of the blockchain with a cryptocurrency.

BRIEF DESCRIPTION OF THE DRAWINGS

The invention will be more fully understood by referring to the following Detailed Description of Specific Embodiments in conjunction with the Drawings, of which:

FIG. 13 illustrates an exemplary hypothetical user interface of the system of FIG. 3, by which pay periods can be established, according to an embodiment of the present invention.

FIG. 14 illustrates an exemplary user interface of the system of FIG. 3 by which, once a pay period ends, the system automatically packages all source records and all electronic tickets of the pay period for a possible future audit, according to an embodiment of the present invention.

DETAILED DESCRIPTION OF SPECIFIC EMBODIMENTS

Figure 1:
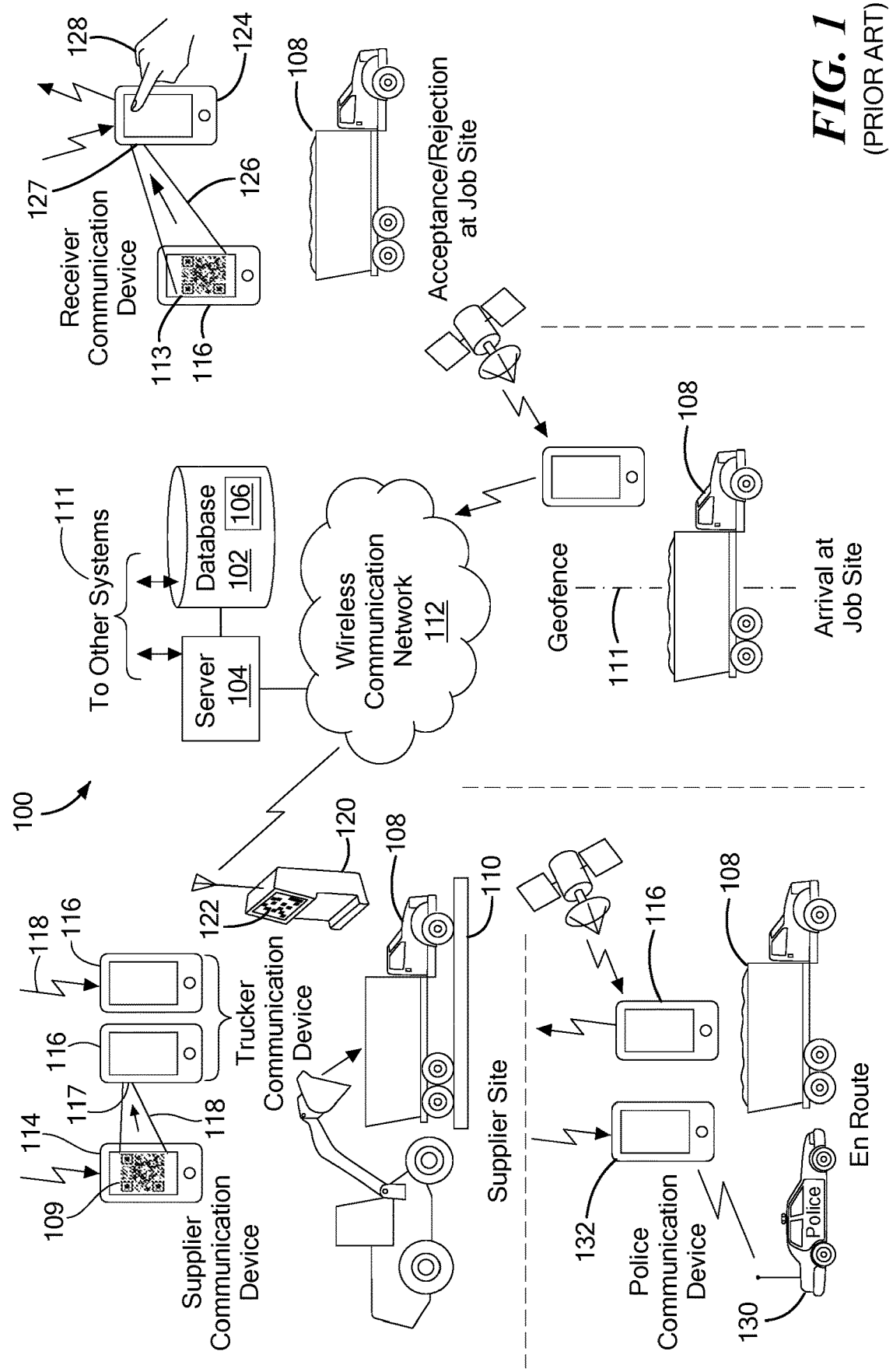
FIG. 1 is a partially schematic diagram of a digital chain of custody system, as well as an environment in which the system operates, according to the prior art.

The invention relates to a construction material quantity certification system, and more particularly to such a system capable of backing quantity certifications and/or payment processes with source records and associated chain of custody information throughout the life cycle of a project and across all parties involved in the project.

Construction, service and maintenance materials, such as ready-mix concrete, aggregates, structural steel beams, hot-mix asphalt ("HMA"), timber, salt, etc., (collectively herein referred to as "construction materials") are used in a variety of construction, service and maintenance projects (collectively herein referred to as "construction projects"), such as roads, bridges, tunnels and buildings. Typically, these construction materials are brought to job sites via trucks that load at supplier facilities and unload at the job sites. Frequently, inspectors inspect the construction materials as they arrive at the job sites, such as to ensure the construction materials meet specified quality, quantity and/or timeliness standards. If a truck load of construction material is accepted by an inspector, custody of the load of construction material transfers from a supplier to an owner of the project, such as a municipality or government agency, such as a department of transportation (DOT), or to a contractor building the project, typically on behalf of the owner.

Conventionally, a chain of custody of each load is maintained using paper records, often multi-part forms. When a truck is loaded, and typically weighed, a paper load ticket is issued by the supplier. The supplier keeps one copy of the load ticket. Another copy or two of the load ticket is given to a driver of the truck that hauls the load. When the truck arrives at the job site, one of those copies is given to the inspector, who may make notes on the copy, such as regarding quality of the delivered construction material.

The received paper records must be used to manually correlate the load to a supplier and then ultimately to a contractor and/or one or more subcontractors who may have had contractual responsibility to supply the load to the project. Once the project owner connects the chain of custody to the contractor, the contractor may be paid for delivery of the load. This is a complex, lengthy, and error prone process even when things run smoothly, but the difficulties may be greatly exacerbated when there is incorrect or incomplete information on the ticket with respect to, for example, the parties involved and when there was a change order made somewhere in the process which deviates from the original contract requirement between the project owner and general contractor.

Although some participants in construction projects maintain all or most of their information in electronic databases, some participants, particularly suppliers and haulers of construction materials, rely at least in part on paper records. Thus, the construction industry needs an intuitive and streamlined system and method to accelerate creation and maintenance of digital connections between industry participants involved in one or more projects. Furthermore, the industry needs a system and method that automatically creates digital relationship backbones to allow construction industry participants to effectively digitize their operations, without undue burden and change management.

Available electronic systems primarily leave the burden of connecting industry participants working on a project to suppliers of construction materials. A supplier is generally, the original source of construction material data. Thus, for a new construction project, the supplier typically initiates an electronic process by inviting other project participants to access the supplier's system. With permission granted by the supplier, the other participants can view information about construction materials supplied by the supplier to various projects. However, this workflow is inefficient, because it requires contractors and subcontractors to register in each supplier's system for every new project. A project typically involves many suppliers, each with its own system.

Because a contractor must fulfil requirements specified in a project owner's database before the project owner will pay the contractor for construction materials delivered to a construction site or construction activity associated with the construction materials, the contractor must also access the project owner's database. However, as noted, the databases maintained by suppliers, contractors, subcontractors, and project owners are typically incompatible. Embodiments of the present invention provide systems that automatically reconcile differences among data stored by various parties involved in a construction project. Other embodiments provide databases that facilitate such reconciliation.

Construction Materials

Construction, service, and maintenance materials, such as ready-mix concrete, aggregates, structural steel beams, hot-mix asphalt ("HMA"), timber, salt, etc., (collectively herein referred to as "construction materials") are used in a variety of construction, service, and maintenance projects (collectively herein referred to as "construction projects"), such as roads, bridges, tunnels, and buildings. Typically, these construction materials are brought to job sites via trucks that load at supplier facilities and unload at the job sites. Frequently, inspectors inspect the construction materials as they arrive at the job sites, such as to ensure the construction materials meet specified quality, quantity, and/or timeliness standards. If a truck load of construction material is accepted by an inspector, custody of the load of construction material transfers from the supplier to an owner of the project, such as a municipality or government agency, such as a department of transportation (DOT), or to a general contractor building the project, typically on behalf of the owner.

Conventionally, a chain of custody of each load is maintained using paper records, often multi-part forms. When a truck is loaded, and typically weighed, a paper load ticket is issued by the supplier. The supplier keeps one copy of the load ticket. Another copy or two of the load ticket is given to a driver of the truck that hauls the load. When the truck arrives at the job site, one of those copies is given to an inspector, who may make notes on the copy, such as regarding quality of the delivered construction material.

Conventionally, the received paper records are used to manually correlate the load to the supplier and then ultimately to the contractor and/or one or more subcontractors who may have had contractual responsibility to supply the load to the project. Once the project owner connects the chain of custody to the contractor, the contractor may be paid for the delivery of, or construction activity associated with, that load. Optionally or alternatively, a chain of custody that ends with custody being transferred to a project owner can be used as backing for a payment schedule that had been agreed upon by the parties. For example, a paving contractor is paid to pave a surface, which includes having appropriate material(s) delivered to a construction site and applying those materials to the surface being paved. In some cases, multiple truckloads of construction material(s) are required for a single construction activity. However, for simplicity of explanation, each delivery referenced herein is assumed to be a single truckload.

The contractor must then attribute the flow of work for that load to one or more subcontractors and ultimately to the supplier of the material load, so that the contractor can pay each entity in the chain for that construction activity or that delivery of the load to the project. This is a complex, lengthy, and error prone process even when things run smoothly, but the difficulties may be greatly exacerbated when there is incorrect or incomplete information on the ticket with respect to, for example, the parties involved or if a change order changed the original contract requirements between the project owner and the contractor.

Some efforts have been made to facilitate calculating the environmental impact of a construction project. For example, an environmental product declaration (EPD) is a verified report designed to quantify the environmental lifecycle impact of an associated product in a standardized manner. EPDs are sometimes used within the construction materials industry in the United States and other jurisdictions to conform to a "cradle-to-gate" life cycle assessment methodology. These reports cover raw material supply (upstream processes) (phase A1), transportation to manufacturing site (phase A2), and core manufacturing processes of materials (phase A3), such as asphalt and concrete. An EPD does not, however, include the environmental lifecycle impact of an associated product during other times, such as construction (ex., use of the product to build a road or parking lot), use of the built project (ex., use of the road or parking lot), maintenance and rehabilitation of the built project, and end of life (ex., demolition and possible recycling of the road or parking lot material) (phases A4, A5, B1-B7, and C1-C4).

An EPD quantifies the environmental impact to produce a unit of a product, such as one short ton of asphalt. For example, an EPD for asphalt may list a number of megajoules (MJ) of renewable primary energy, excluding renewable primary energy resources, used as raw materials (PERE), a number of cubic meters of net fresh water used, and an amount of global warming air (kilograms (kg) of carbon dioxide equivalent) produced, in each of phases A1, A2 and A3. Most EPDs are specific to a specific product made at a specific plant. However, an EPD can also be generated based on an average across a type of product over multiple producers.

EPDs are increasingly being demanded by stakeholders within the construction ecosystem as currently they are the single most trusted option to quantify environmental impact of a project. Unfortunately, EPDs are only able to quantify a portion of a project's environmental impact, and they quite often rely on input values that are formed from national averages.

Systems and methods for capturing, analyzing, and communicating environmental lifecycle impact of construction materials used in a construction project are described in U.S. patent application Ser. No. 17/565,620 ("Construction Project Environmental Impact Decision Support System," the "'620 application"), the entire contents of which are hereby incorporated by reference herein, for all purposes. As described in the '620 application, historical information about actual hauls of construction materials in previous projects may be used to improve standard estimates of environmental impacts of construction materials specified for an upcoming construction project to yield an improved estimate of environmental impact of the upcoming construction project.

Construction Project Database Reconciliation System

As noted, embodiments of the present invention provide systems that automatically reconcile differences among data stored by various parties involved in a construction project. Other embodiments provide databases that facilitate such automatic reconciliation.

Figure 2:
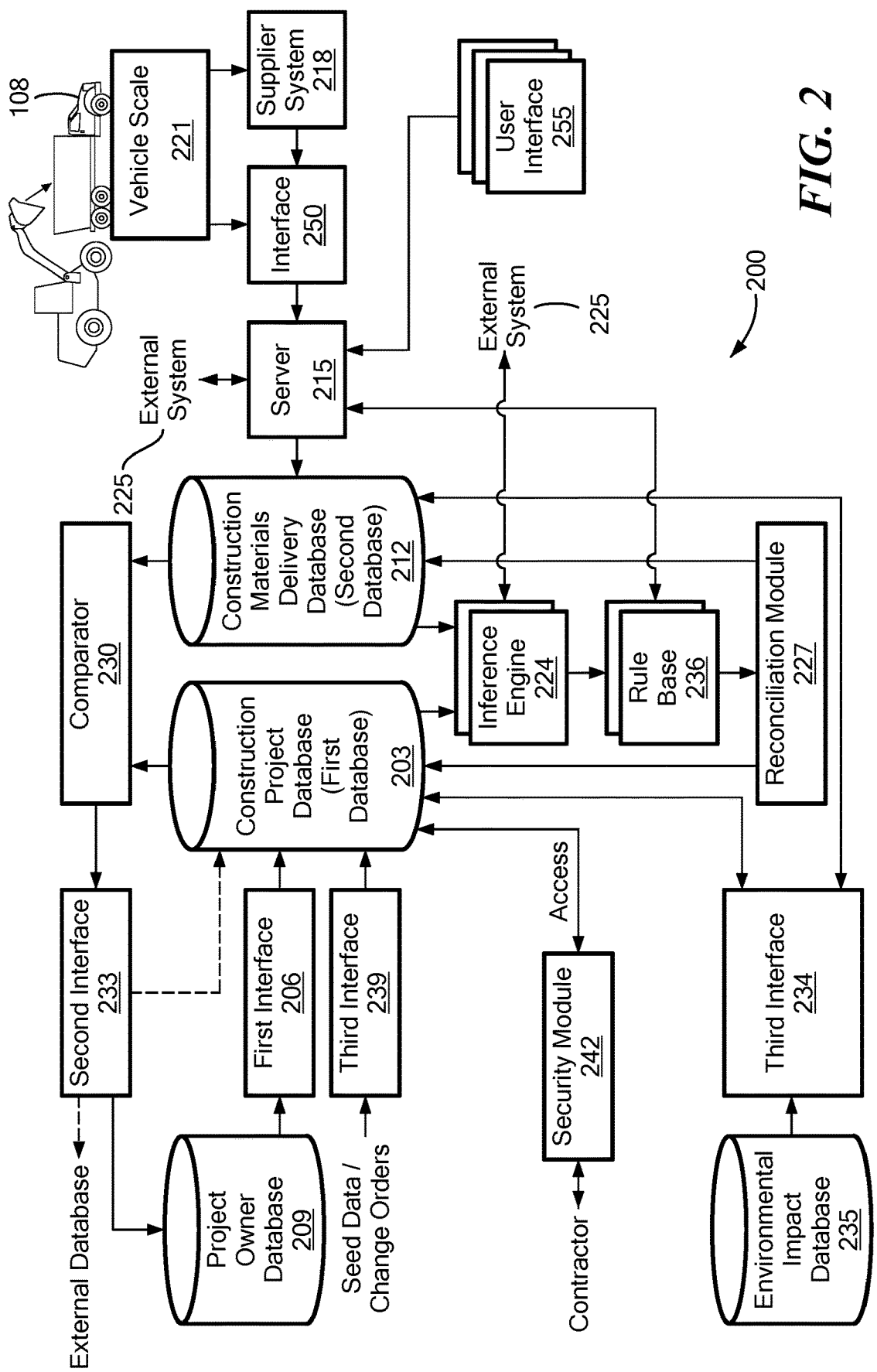
FIG. 2 is a partially schematic diagram of a construction material quantity certification system, according to an embodiment of the present invention.

FIG. 2 is a schematic block diagram of a construction project database reconciliation system 200, according to an embodiment of the present invention. A construction project database (first database) 203 is configured to store construction project data. The project data includes at least project specification data for each of a plurality of projects. The project specification data is sufficient to identify minimum requirements of a project contract. For example, the project specification data is sufficient to identify minimum requirements of materials delivered to the construction project.

The first database 203 may, for example, be or include a computer-aided design (CAD) model for each of the plurality of projects. Optionally or alternatively, the first database 203 may be or include building information model (BIM) data for each of the plurality of projects. The terms "building information model" and "building information modeling" have their ordinary meanings as used by practitioners in the art, for example as defined in ISO 19650-1:2018.

Each project's project specification data includes information about construction materials to be used in the project's construction, as well as information about where the construction materials are to be used. For example, the information about the construction materials specifies material type, quantity, quality, etc. For a road construction project, for example, the information about the construction materials may include information about gravel, crushed stone, and/or other materials to be used to prepare a base course, as well as information about pavement, such as such as hot-mix asphalt, concrete, or another suitable material, to be laid down on top of the base course.

The information about where the materials are to be used may include x, y, and z co-ordinates or their equivalents. Continuing the road construction project example, the location information may specify an order in which materials of the base course are to be laid down, as well as a number and respective thicknesses of each layer of base course and pavement.

The first database 203 is also configured to store contractor data for each of a plurality of contractors, such as which contractors have won bids on various aspects of various projects. The contractor data identifies individual contractors and which portions of each project the respective contractors have been contracted to perform. For example, "Acme Construction" may be the successful bidder to remove and replace the wearing course of existing asphalt roadway by first milling up the old pavement and then placing a layer of new hot mix asphalt pavement on the base course to economically extend the design life of the roadway. The contractor identity may be represented in any suitable form, such as text name, unique entity identifier (UEI), D-U-N-S number, universally unique identifier (UUID), globally unique identifier (GUID), or an arbitrary identifier. D-U-N-S is a registered trademark of Dun & Bradstreet, Inc.

The construction project data of the first electronic database 203 may also include supplier data for each of a plurality of suppliers. The construction project data of the first electronic database 203 may also include supplier data for each of a plurality of approved suppliers.

The first database 203 may also be configured to store data about employees or agents of project owners, for example inspectors who will inspect loads of construction materials delivered to construction sites. This data may include information associating each inspector with a respective project, construction site, type of material to be inspected, type of contractor to be inspected, and/or geographic location where the inspector is expected to operate. This data may also include information day and time schedules of the inspectors, particularly if a given inspector is expected to operate at different locations or different projects at different times.

A first interface 206 is configured to couple to a project owner electronic database 209 and automatically fetch project specification data and contractor data from the project owner database 209 and store fetched project specification data and fetched contractor data in the first database 203. The first interface 206 may automatically fetch the data about the employees or agents of the project owners from the project owner electronic database 209 and automatically store the fetched data in the first database 203. The project owner database 209 is typically, but not necessarily, separate from the first database 203. However, in some cases, the project owner database 209 and the first database 203 are co-located or occupy a common datastore.

The project owner database 209 is typically, but not necessarily, maintained by a department of transportation or other project owner, such as a building owner. The data in the project owner database 209 is not necessarily stored in the same format as the data in the first database 203. Typically, the data in the project owner database 209 is stored in a format different from the format of the data in the first database 203. For example, at least one department of transportation has attempted to mandate a data format to be used by all contractors. However, this effort has met with little success and much resistance from construction industry participants, because the participants wish to keep their data in their own respective formats.

If necessary, the first interface 206 is configured to automatically reformat the fetched project specification data and the fetched contractor data into a common format prior to storing the fetched, reformatted project specification data and fetched, reformatted contractor data in the first database 203. The data may, for example, be reformatted into a common data format that complies with an owner's specific source documentation requirements. In some embodiments, the first interface 206 is configured to automatically heuristically reformat the fetched project specification data and the fetched contractor data into a common format prior to storing the fetched project specification data and fetched contractor data in the first database. Reformatting of fetched data is described in more detail herein.

A second electronic database 212 is configured to store information about a plurality of deliveries of construction materials to respective construction sites. For each delivery of a delivered construction material, the second database 212 is configured to store: an identification of the delivered construction material, an identification of a source of the delivered construction material, and an identification of a delivery location of the delivered construction material.

Systems and methods for constructing, populating, and maintaining the second database 212 are described in U.S. Pat. No. 11,210,635 ("Construction Material Digital Chain of Custody System," the "'635 patent") and U.S. patent application Ser. No. 17/513,745 ("Construction Material Digital Chain of Custody System," the "'745 application"), the entire contents of each of which are hereby incorporated by reference herein, for all purposes. A drawing from the '635 patent is reproduced herein as FIG. 1, for reference.

The database 102 described in the '635 patent and the '745 application may be used as the second database 212 described herein. Optionally or alternatively, the second database 212 described herein may be a copy or subset of the database 102 described in the '635 patent and the '745 application.

As noted in the '635 patent and the '745 application, the database 212 is configured to store electronic load tickets 106. Each load electronic load ticket 106 is a record in the database 102 and is associated with a respective haul of construction materials by a vehicle 108. Each electronic load ticket 106 includes respective initial load data related to the haul, including custody data. A server 104 maintains the electronic database 102. The server 104 updates custody data about each haul of construction materials by updating the respective electronic load tickets 106. For example, after a haul of construction material is accepted by an inspector, the server 104 may update the corresponding electronic load ticket 106 to reflect a change in custody of the construction material, such as from the supplier to the project owner.

Returning to FIG. 2, a server 215 is configured to automatically store information in the second database 212 as respective construction materials are obtained from respective suppliers and delivered to respective delivery locations. For example, the server 215 may be configured, for each delivery of a delivered construction material, to automatically receive, from a system 218 coupled to a vehicle scale 221, an identification of the delivered construction material and an identification of a source of the delivered construction material, and store, as the information in the second database 212, the identification of the delivered construction material and the identification of the source of the delivered construction material. The system 218 may, for example, be implemented as described in the '635 patent and the '745 application, with respect to the server 104 and/or other system 115.

Furthermore, the second database 212 may be configured to maintain chain-of-custody information for each delivery of construction material of the plurality of deliveries of construction materials. The server 215 may be configured to update the chain-of-custody information, as custody of construction material in each delivery of construction material changes.

Automatic Association

The systems described in the '635 patent and the '745 application do not necessarily associate deliveries to contractors. However, the server 215 described herein is configured to automatically associate each delivery of a delivered construction material to an associated contractor, in particular, the contractor who is contractually responsible for the delivery of the construction material and who is entitled to be paid, if the delivery and/or associated construction activity is successfully completed. In general, each delivery of a delivered construction material has an associated load ticket. For simplicity of explanation, a delivery of a delivered construction material is sometimes referred to herein by its associated load ticket.

In some cases, load tickets sufficiently identify contractors, in which cases the server 215 can use the identifying information in the load tickets to associate the corresponding deliveries of the delivered construction materials to corresponding contractors and store corresponding association data in the second database 212. However, in other cases, load tickets lack direct contractor identifying information. In these cases, the server 215 automatically infers associations between the deliveries of the delivered construction materials and the contractors.

Associations between deliveries of delivered construction materials and contractors may be inferred in any suitable manner. For example, one or more pieces of evidence may be used to infer a candidate association. One candidate association may be selected from among a plurality of competing candidate associations, such as based on confidence values calculated for the respective candidate associations. In general, data available from a load ticket, optionally with data available in the first and/or second databases 203 and/or 212, may be used as evidence in support of, or against, a given candidate association.

Historical information about past deliveries may be used to infer a candidate association. For example, if a contractor identification listed on a load ticket does not match any contractor associated with a current project in the first or second database 203 or 212, but the contractor identification from the load ticket does match a contractor identification associated with a past project in the first or second database 203 or 212, and the first or second database 203 or 212 stores an alias for the contractor in relation to the past project, and the alias matches a contractor associated with a present project, the alias may be taken as a candidate contractor inference.

The alias may, for example, reflect a change in legal name of an entity, or a common misspelling of the name of the entity, or a nickname of the entity. The alias may include an alternative means of identifying the contractor, such as a contractor identification number, UEI, D-U-N-S number, or the like. The alias may have been previously manually entered into one of the databases 203 or 212, or the alias may have been previously automatically inferred and stored. Optionally or alternatively, the server 215 or an inference engine 224 (described in detail herein) may automatically search an external database, such as the U.S. Government System for Award Management (SAM.gov) or Dun & Bradstreet D-U-N-S number lookup, or consult an external search engine, such as Google, in an effort to match the contractor identifier in the load ticket to a contractor identified in the first or second database 203 and/or 212. Such an external system is indicated at 225.

Optionally or alternatively, a chain of lookups and/or inferences may be followed to reach a candidate or final association, or to gather evidence for or against an inference. For example, a load ticket for a particular material, such as concrete, may identify a particular project, without directly identifying a contractor. If, in the first and/or second database 203 and/or 212, the project data for the identified project lists only one contractor that is to deliver the particular material, the contractor associated with the load ticket, and therefore the delivered construction material, may be inferred to be the contractor identified in the project data.

If a contractor inference is drawn, and the load ticket contains an otherwise unusable contractor identifier, the unusable contractor identifier may be stored in the second database 212 as an alias for the contractor. Thus, as more construction materials and construction projects are handled, the system 200 can automatically develop a progressively better ability to draw inferences.

The system 200 also includes a data reconciliation module 227. The data reconciliation module 227 is configured to use the information in the first and second databases 203 and 212 to automatically associate each delivery of a delivered construction material to an associated project in the project specification data of the first database 203. As with associating a delivery of delivered construction material to a contractor, if a load ticket sufficiently identifies a project, the project identification information in the load ticket may be used to associate the delivery to the project. On the other hand, if the load ticket lacks direct project identifying information, the system automatically infers the project identification, in a manner similar to that described with reference to the server 215.

For example, if a load ticket includes a textual project name or numerical project identifier, but the first and second databases 203 and 212 do not store a project indexed by the included textual project name or numerical project identifier, the reconciliation module 227 may search the databases 203 and 212 for an alias project identifier that matches a current project and is associated with a textual project name or numerical project identifier in the load ticket. As with contractor aliases, project aliases may be previously manually entered and/or automatically added to the database 203 and/or 212 in response to inferences that were automatically drawn.

Known characteristics and/or limitations of construction materials may be used to automatically infer associations between deliveries of construction materials and construction projects. For example, some construction materials, such as concrete, must be delivered within certain timeframes or distances. The American Concrete Institute recommends concrete be discharged from a delivery truck within 1.5 hours of being batched, or 300 revolutions of the truck, whichever occurs first. Thus, concrete for a project generally cannot originate more than 1.5 travel hours, or the equivalent to 300 revolutions, from the project's construction site.

Given a time of delivery and local road and traffic conditions between the construction site where a given load of concrete is delivered and candidate concrete suppliers, the reconciliation module 227 automatically calculates a maximum distance the load of concrete could have traveled from a supplier. If only one supplier lies within the maximum distance, the reconciliation module 227 may infer the supplier supplied the concrete. If multiple suppliers lie within the maximum distance, the reconciliation module 227 can eliminate other candidate suppliers that lie beyond the maximum distance, from it inferences.

If multiple viable candidate suppliers remain, the reconciliation module 227 may use additional conditions to narrow the pool of candidate suppliers to a single choice or a best choice. For example, the supplier closest to the construction project site is more likely to have supplied the concrete than a more distant supplier.

In another example, if the reconciliation module 227 detects that concrete deliveries from a given supplier generally occur at approximately regular intervals, but a particular concrete delivery occurred at an odd interval, the reconciliation module 227 may use the odd interval delivery as evidence against inferring that the particular delivery originated with the given supplier. On the other hand, if a particular concrete delivery occurred according to the regular intervals, and no other concrete delivery from the given supplier occurred during the same interval, the reconciliation module 227 may use the regular interval delivery as evidence in favor of inferring that the particular delivery originated with the given supplier.

Furthermore, with sufficient sample points, the reconciliation module 227 may draw inferences that vary by location, project type, construction material type, contractor, local modus operandi, or other factors. For example, roads in and around Boston are generally narrower and more congested than roads in and around St. Louis and, therefore, in order to meet maximum travel times, concrete suppliers may need to be closer to respective construction sites in Boston than in St. Louis.

Even if a construction material, such as gravel, would not spoil after a predetermined amount of travel time, economic considerations, such as fuel and labor costs, may put practical limits on travel times or distances that the reconciliation module 227 may exploit. These limits may be manually entered and/or automatically inferred from past project data.

Of course, these limits may vary by geography. For example, although potential sources of crushed stone, sand, and gravel are distributed across most of the conterminous United States, they occur in very limited supply in some regions, such as coastal plain and Mississippi embayment, Colorado plateau, Wyoming basin, glaciated midwest, high plains, and the non-glaciated northern plains. Thus, travel times or distances from suppliers in these regions may be greater than in other areas of the United States. Again, these limits may be manually entered and/or automatically inferred from past project data.

A geographic location, to which a load of construction material is delivered, may be used to automatically infer a project for which the construction material is delivered. Geographical information manually entered, such as by an inspector at a construction site, or automatically collected, such as by a global positioning system (GPS) receiver, may be used to geolocate a delivery of construction material. The construction project data stored in the first database 203 includes the geographic location of the project, thereby enabling the reconciliation module 227 to compare locations of delivered construction materials and locations of projects to identify to which project a given load of construction material is delivered. As noted, once the project is inferred, the project identity may be used to infer other data, such as the supplier and/or contractor associated with the load.

Information in the first database 203 about which inspectors are expected to operate at various projects, locations, times, etc. may be used to infer information about deliveries of construction materials. For example, if a given inspector approves a given delivery of a construction material, and the inspector is expected to operate at a particular project, the reconciliation module 227 may infer the given delivery is of a particular construction material, or the given delivery is associated with the particular project, even if nothing else is known about the delivery. The time and/or date of the delivery, in conjunction with the inspector's schedule, may be used to resolve ambiguity, such as if the inspector is expected to operate at different projects at different times. The inferred project may be used to draw further inferences, such as identity of an associated contractor.

Other aspects of the inspector's role may be used to resolve ambiguities. For example, if the inspector is expected to inspect only concrete and structural steel, deliveries inspected by the inspector can be assumed to be either concrete or structural steel, and not asphalt. In general, an inference drawn based on information about an inspector who inspected a delivery of construction material should have a relatively high confidence value, for example in contrast with an inference drawn based on distance from a construction site to two or more possible gravel suppliers.

Descriptions and examples of inferences drawn by the server 215 also apply to the reconciliation module 227, and vice versa, mutatis mutandis.

Specification Comparator

Once other information about a delivery of delivered construction material is ascertained, either directly from a load ticket or inferred, the project and contractor in the first database 203 are known. A comparator 230 then automatically verifies the delivered construction material complies with material specification requirements in the project specification data of the associated project. The comparator 230 is configured, for each delivery of a delivered construction material, to use the information in the first and second databases 203 and 212 to automatically verify the respective delivered construction material complies with material specification requirements in the project specification data of the associated project.

The information in the second database (construction material delivery database) 212 identifies the construction material that was delivered and the associated contractor. The comparator 230 can then fetch a corresponding item from the project data. For example, if the first database 203 includes BIM data, the comparator 230 can fetch a BIM item that corresponds to the delivered construction material, for example based on location where the construction material was delivered, time of the delivery, project identifier, and contractor associated with the delivery. The delivery location can be a 3-dimensional location. For example, if the delivered construction material is a component of a road, the height (z component of the location) correlates with a layer of the base course or pavement.

The comparator 230 can use this information to identify the BIM item or other item in the first database 203 that corresponds to the delivered construction material. The comparator 230 then compares requirements of the identified item to a description of the delivered construction material to ascertain whether the delivered construction material meets the requirements. For example, if the first database 203 item specifies pavement, and the delivered construction material is hot-mix asphalt or concrete, the comparator 230 may determine that the delivered construction material meets the requirement. On the other hand, if the first database 203 item specifies asphalt, and the delivered construction material is concrete, the comparator 230 may determine that the delivered construction material does not meet the requirement.

A second interface 233 is configured, for each delivery of a delivered construction material for which the comparator 230 verification succeeds, to automatically store delivery confirmation data for the delivered construction material and the associated contractor. The second interface 233 may be configured to couple to the project owner database 209. The second interface 233 may be configured to automatically store the delivery confirmation data in the project owner database 209, in the first database 203, and/or in an external database (not shown). The delivery confirmation data may include payment approval data. Thus, once the comparator 230 verifies that delivered constructions material meets the requirements of the project, the contractor can be paid.

As noted, the first interface 206 may be configured to automatically reformat the fetched project specification data and the fetched contractor data into a common format prior to storing the fetched project specification data and fetched contractor data in the first database 203. This reformatting may include storing manually entered and/or previously automatically inferred aliases. The first interface 206 may be configured to automatically reformat the fetched project specification data and/or the fetched contractor data into an openBIM format, such as a well-known vendor-neutral format, such as IFC, BCF, COBie, CityGML, or gbXML.

Optionally, the system 200 includes a third interface 234 configured to couple to an environmental impact database 235. The environmental impact database 235 stores information about a plurality of construction materials. For each construction material, the environmental impact database 235 stores: (a) an identification of the construction material and (b) an estimated environmental impact of the construction material. Implementation of such an environmental impact database 235 is described in the '620 application, where it is referred to as a "first database."

The third interface 234 is configured to associate (a) ones of the plurality of construction materials stored in the environmental impact database 235 with (b1) ones of the plurality of projects stored in the first electronic database 203 and/or (b2) ones of the plurality of deliveries of construction materials stored in the second electronic database 212.

An environmental impact of a load of construction material may be used to automatically infer a supplier of the construction material, a project for which the construction material is delivered, and/or a contractor for whom the construction material is delivered. For example, a supplier may annotate a load ticket to identify the environmental impact of the construction material, or an inspector may identify the material and annotate the load ticket with the environmental impact of the construction material. The server 215, the reconciliation module 227, and/or the inference engine 224 may use the environmental impact of the load of construction material as evidence that the load of construction material is or is not associated with a particular project, supplier, and/or contractor, for example based on whether the first or second database 203 or 212 lists project, supplier, and/or contractor who or that is expected to have the noted environmental impact, or who or that is expected to receive construction material that has the noted environmental impact.

EPDs may be parts of, or linked to, source records for construction materials and can, therefore, be used to facilitate identifying when a load of construction material has been delivered in fulfillment of a contractual obligation. For example, an EPD logically links a producer and a plant to a type of construction material.

Furthermore, an EPD, or information from an EPD, may be a prerequisite before payment for a load of construction material is authorized. In other words, an EPD or information from an EPD may be a contractual requirement, before payment is authorized. Associating deliveries of loads of construction materials with respective EPDs documents satisfaction of such contractual requirements.

Optionally, the system 200 includes an electronic rule base 236. The data reconciliation module 227 may be configured to use the rule base 236 to automatically associate each delivery of a delivered construction material to an associated project in the project specification data of the first database 203. The rule base 236 may store rules, according to which inferences may be drawn. For example, concrete for a project cannot originate more than 1.5 travel hours, or the equivalent to 300 revolutions, from the project's construction site. Other examples of rules are described herein, for example with respect to the server 215 and with respect to the reconciliation module 227.

Optionally, the system 200 includes an inference engine 224. The inference engine 224 may be configured to automatically generate rules for the rule base 236. The inference engine 224 may be configured to automatically infer an association between a delivery of a delivered construction material and a project in the project specification data of the first database 203. The inference may be drawn based at least in part on proximity of the source of the delivered construction material to a construction site where the delivered construction material is delivered. For example, as described with respect to the reconciliation module 227, the closest supplier to a construction site is more likely to have delivered the construction material than a more distant supplier, particularly if the construction material must be used within a relatively short period of time after being loaded at the supplier site.

The inference may be drawn based at least in part on a match between an identification of the delivered construction material and project specification data of one project of the plurality of projects in the first database. For example, if a particular construction material is delivered, only construction projects that require that construction material at about the current time need be considered. For example, if two road construction projects are currently under way, and the base course of only one of these projects has been completed and pavement is now being laid there, then a delivery of gravel, sand, or crushed stone is likely associated with the other of the two projects.

The inference may be drawn based at least in part on a match of a name in project specification data of one project of the plurality of projects in the first database. For example, a load ticket may indicate a project name (ex., "Main Street Bridge") or a project owner (ex., "Pennsylvania DOT") rather than an official identifier of a project, as stored in the first database 203. Nevertheless, the first or second database 203 or 212 may store such a nickname or alias of the project.

The inference may be drawn based at least in part on a combination of these bases.

The data reconciliation module 227 may be configured to use the rule base 236 to automatically associate each delivery of a delivered construction material to an associated contractor of the plurality of contractors in the first database 203. The inference engine 224 may be configured to automatically infer an association between a delivery of a delivered construction material and a contractor of the plurality of contractors in the first database 203. For example, if a contractor is known to be associated with a given project due to other deliveries for that contractor to that project, as reflected by entries in the second database 212, then a delivery to the given project may be associated with the contractor, particularly if the delivered construction material matches a phase of the construction project that the contractor is responsible for and that is currently under way, as reflected in the first database 203.

The inference may be drawn based at least in part on proximity of the source of the delivered construction material to a construction site where the delivered construction material is delivered. The inference may be drawn based at least in part on a match between an identification of the delivered construction material and project specification data of one project of the plurality of projects in the first database. The inference may be drawn based at least in part on a match of a name in project specification data of one project of the plurality of projects in the first database. The inference may be drawn based at least in part on a combination of these bases.

The inference engine 224 may be configured to automatically infer an association between a delivery of a delivered construction material and a project in the project specification data of the first database 203. The inference engine 224 may be configured to automatically infer the association based at least in part on proximity of the source of the delivered construction material to a construction site where the delivered construction material is delivered. The inference engine 224 may be configured to automatically infer the association based at least in part on a match between an identification of the delivered construction material and project specification data of one project of the plurality of projects in the first database. The inference engine 224 may be configured to automatically infer the association based at least in part on a match of a name in project specification data of one project of the plurality of projects in the first database. The inference engine 224 may be configured to automatically infer the association based at least in part on a combination of these bases.

The inference engine 224 may be configured to automatically infer an association between a delivery of a delivered construction material and a contractor of the plurality of contractors in the first database 203. The inference engine 224 may be configured to automatically infer the association based at least in part on proximity of the source of the delivered construction material to a construction site where the delivered construction material is delivered. The inference engine 224 may be configured to automatically infer the association based at least in part on a match between an identification of the delivered construction material and project specification data of one project of the plurality of projects in the first database. The inference engine 224 may be configured to automatically infer the association based at least in part on a match of a name in project specification data of one project of the plurality of projects in the first database. The inference engine 224 may be configured to automatically infer the association based at least in part on a combination of these bases.

Descriptions and examples of inferences drawn by the inference engine 224 also apply to the server 215 and to the reconciliation module 227, and vice versa, mutatis mutandis.

Essentially, the project specification data stored in the first database 203 is equivalent to agreements in a contract between the project owner and respective contractors, in that the project specifications specify minimum requirements (material, quantity, quality, timeliness, etc.) of construction materials to be delivered by the contractors. If the first database 203 is or includes BIM data or similar set of information, items in the first database 203 precisely identify each construction material, or class of material, to be used and where and when it is to be used. Thus, these specifications are tantamount to contract provisions and express initial expectations of the parties. Indeed, some departments of transportation are moving toward using a BIM or similar structure in place of a contract.

As noted, the first and/or second database 203 and/or 212 may be manually seeded with data, such as contractor or project aliases, construction material travel time or distance limits, and the like. A third interface 239 may be used to enter such seed data. Thus, the third interface 239 may be used to populate or augment the first database 203 with project specifications which, as noted, are tantamount to contract provisions. Similarly, the third interface 239 may be used to enter project change orders, which are nearly inevitably needed in all but the smallest of projects. Thus, the third interface 239 may be configured to receive a change order and, in response to receiving the change order, revise a corresponding portion of the construction project data of the first database.

Optionally or alternatively, the first and/or second database 203 and/or 212 may initially be empty and automatically filled as projects progress and construction materials are delivered to construction project sites.

Optionally, a contractor may select suppliers and/or subcontractors before a project begins, and the contractor may pre-populate the first database 203 with information about the selected suppliers and/or subcontractors, including associations therebetween and between the project and the selected suppliers and/or subcontractors. Furthermore, a contractor may inject test load tickets into the system 200. Each test load ticket is similar to a load ticket, but the test load ticket does not represent an actual delivery of construction material. Nevertheless, the system 200 processes the test tickets and can make inferences and build rules, as described herein, however any delivery confirmation data stored by the second interface 233 is marked to indicate the confirmation is for a test delivery and, therefore, no actual payment is approved. These test load tickets may, therefore, be used to prime the first and/or second database 203 and/or 212 for actual load tickets for a project and/or test accuracy of inferences drawn by components of the system 200. As a result of these tests, if inadequate or erroneous behavior is detected, business logic in the inference engine 224, the server 215, and/or other components of the system 200 may be corrected or enhanced.

Since the first and/or second databases 203 and/or 212 may be legitimately accessed by many entities, but these entities typically have legitimate reason to access only respective subsets of the data in the databases 203 and/or 212, a security module 242 may be included to limit access by each entity to respective specific data in the databases 203 and/or 212. Some access may be limited to read-only, whereas other data may be accessible as read-write. For example, a contractor may be permitted to read, but not write, material specifications, whereas the contractor may be permitted to write data representative of deliveries the contractor has made. Thus, the security module 242 may be configured to control access by each contractor of the plurality of contractors to individual project specification data items stored in the first database.

Optionally, the first or second database 203 or 212 may include or be implemented as a public ledger (blockchain). A blockchain is a growing list of records, called blocks, that are linked together using cryptography. Each block contains a cryptographic hash of the previous block, a timestamp, and transaction data, generally represented as a Merkle tree. The timestamp proves that the transaction data existed when the block was published to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks.

A blockchain is typically managed by a peer-to-peer network for use as a publicly distributed ledger, where nodes collectively adhere to a protocol to communicate and validate new blocks. Although blockchain records are not unalterable, as forks are possible, blockchains may be considered secure by design and exemplify a distributed computing system with high Byzantine fault tolerance.

Typically, the safety, integrity and balance of such ledgers is maintained by a community of mutually distrustful parties. These parties use their computers to help validate and timestamp transactions, adding them to the ledger in accordance with a particular timestamping scheme. Transactions may be validated by holders of an associated cryptocurrency, sometimes grouped together in stake pools. All such parties and holders are collectively referred to as "miners."

The construction industry is characterized by a high level of mistrust among its participants. A blockchain-implemented first or second database 203 or 212 enables such participants to enter their own respective data and trust that data entered by others cannot be surreptitiously altered. Furthermore, an associated cryptocurrency provides an incentive for miners to validate the transactions. Thus, the blockchain may be configured to reward miners of the blockchain with a cryptocurrency.

As noted, as more construction materials and construction projects are handled, the system 200 can automatically develop a progressively better ability to draw inferences, for example because the rule base 236 is automatically enlarged over time by the inference engine 224.

Construction Material Quantity Certification

The United States Federal Highway Administration (FHWA) reimburses some department of transportation projects, such as some bridges and roads. However, FHWA requires source documentation for materials used in such projects. This source documentation must relate to the value of work performed or materials delivered for each line item to be reimbursed. The source documentation must be from a "trustworthy" source. However, FHWA delegates to departments of transportation certification of vendors as being trustworthy sources of source documentation.

Projects, for which departments of transportation expect to receive reimbursement, are subject to audit by the FHWA. During such an audit, actual pay items are compared to original estimates. All transaction information for a day's pay items is reviewed to confirm it adds up to the reimbursement amount being requested.

The construction material quantity certification system described herein provides components and user interfaces that collect, store, process, and provide information sufficient to enable a department of transportation to certify receipt of services and construction materials that reasonably conform with plans and specifications of construction projects, including source documentation that satisfies FHWA requirements.

Such a construction material quantity certification system includes a first electronic database configured to store construction project data. The project data includes project specification data for each of a plurality of projects, and contractor data for each of a plurality of contractors engaged for ones of the projects. The first database 203 described with reference to FIG. 2 is exemplary of such a database.

The system also includes a second electronic database configured to store data about a plurality of deliveries of construction materials to respective construction sites of respective projects. For each delivery of a delivered construction material, the second database is configured to store an identification of the delivered construction material. The second database is also configured to store a source record that identifies a source of the delivered construction material and chain of custody data about the delivered construction material and extending from the source of the delivered construction material. The second database 212 described with reference to FIG. 2 is exemplary of such a database.

Although two databases 203 and 212 are described herein, the two databases 203 and 212 may be combined, or their contents may be divided in other ways. The first and second databases 203 and 212 store at least the source records in an open and machine-readable language. At least the source records are stored in a manner that protects the data from unauthorized alteration. Because these source records are original records stored electronically and cannot be altered, no need exists to retain paper copies of these records.

The first and second databases 203 and 212 should be configured to ensure original source documents are retained for at least three years after final voucher payment on a given project. It should be noted that final voucher payment may occur significantly later than end of a project. Because the system certifies construction material quantities for payment, the system, the system stores or can calculate or estimate a date of the final voucher payment and can, therefore automatically calculate or estimate an end date of the three-year retention period.

As noted, each electronic load ticket 106 is a record in the database 102 (FIG. 1) and is associated with a respective haul of construction materials by a vehicle 108. Each electronic load ticket 106 includes respective initial load data related to the haul, including custody data. A server 104 maintains the electronic database 102. The server 104 updates custody data about each haul of construction materials by updating the respective electronic load tickets 106. For example, after a haul of construction material is accepted by an inspector, the server 104 may update the corresponding electronic load ticket 106 to reflect a change in custody of the construction material, such as from the supplier to the project owner.

The second database 212 (FIG. 2) therefore stores information about quantities of construction materials delivered to respective construction sites. The quantities are stored in units appropriate for use in determining pay quantities. For example, asphalt quantities may be stored in tons. Concrete quantities may be stored in cubic yards, linear feet equivalent (such as for poured sidewalk), square feet equivalent (such as for poured pads), or finished objects (such as bridge deck or bridge abutment). Furthermore, a first party, such as a contractor, may pay a second party, such as a contractor, according to a first unit, such as tons, whereas a third party, such as a project owner, may pay the contractor on a schedule, such as based on percent of project completed. If necessary, the server 215 automatically converts quantities of delivered construction materials into pay quantities, such as by using standard widths and thicknesses of poured concrete sidewalks.

The system also includes an electronic interface 250 to a plurality of devices (only one of which is shown in FIG. 2). Each device is configured to provide data about respective quantities of construction materials loaded onto, or unloaded from, respective vehicles. An example of such a device is the vehicle weight scale 221 described herein.

Another example of such a device is an automated system in a front-end or other type of loader that senses mechanical stress on a structural member or hydraulic load while lifting a bucket and, thereby, automatically calculates or estimates a quantity of construction material being loaded into a transport vehicle or deposited at a construction site. In some cases, such devices estimate weight or volume of the construction material based at least in part on mechanical stress on an arm that lifts a bucket or hydraulic pressure and/or hydraulic fluid flow volume or rate and/or time required to load or unload the construction material. Optionally or alternatively, volume of a bucket of a loader may be used to automatically calculate or estimate the quantity of the construction material, for example based on a number of trips/buckets required to load or unload the construction material. In any case, the device or the server 215 may calculate a weight from a volume, or a volume from a weight, given a predetermined density of a construction material, or perform another necessary conversion to arrive at a pay quantity for the construction material.

Yet another example of such a device is an automated system in an asphalt or concrete paving machine or screed machine (collectively referred to herein as a "paver") that automatically senses paver operating parameters and, thereby, automatically calculates or estimates a quantify of construction material being laid in a course of pavement. In some cases, such devices estimate weight or volume of the construction material based at least in part on operating parameters of pavers, such as angle of attack of a free-floating screed within a paver (which determines thickness of a course), width of the course put down by the paver (typically fixed for each paver model, alternatively operator selectable or automatically determined), travel speed of the paver, speed of operation of a material transfer unit, and/or operating time and/or distance of the paver.

The server 215 is coupled to the electronic interface 250 and is configured to automatically obtain the data about the respective quantities of construction materials from the plurality of devices and store the data about the respective quantities of construction materials in the second database 212 as the respective quantities of construction materials are obtained from respective suppliers and delivered to respective construction sites.

In some embodiments, at least one device of the plurality of the devices configured to provide data about respective quantities of construction materials loaded onto respective vehicles includes a weight scale. In some embodiments, at least one device of the plurality of the devices configured to provide data about respective quantities of construction materials loaded onto, unloaded from, respective vehicles includes a system configured to automatically measure effort exerted by a mechanical system to load or unload the construction material and estimate a quantity of the construction material based at least in part on the effort exerted by the mechanical system. In some embodiments, at least one device of the plurality of the devices configured to provide data about respective quantities of construction materials loaded onto, or unloaded from, respective vehicles includes a system configured to automatically estimate a quantity of the construction material based at least in part on a predetermined volume of a bucket of a mechanical construction material loading system.

The server 215 is configured to associate each delivery of a delivered construction material to an associated contractor and to an associated project in the project specification data of the first database 203 and update the chain of custody data about the delivered construction material, as described herein.

The system includes one or more user interfaces, examples of which are indicated at 255. Each of these user interfaces 255 may be implemented on a respective personal computer or on a portable computing device, such as a tablet computer, mobile phone, PDA, or the like. Not all the user interfaces 255 need necessarily be implemented on the same kind of computing device. The server 215 is configured, in response to receipt of a user input via a first user interface 255, to use data in the second database 212 about a subset of the delivered construction materials, and data in the first database 203 about the contractor and the project associated with the subset of the delivered construction materials, to automatically store a construction material quantity certification that is traceable to a plurality of the source records of delivered construction materials.

Functions, such as use data in the first and second databases to automatically store a construction material quantity certification that is traceable to a plurality of the source records of delivered construction materials, can be partly performed by a device, for example mobile phone or tablet computer, hosting a user interface. Nevertheless, for purposes of this description and the claims, these functions are considered to be performed by the server.

In some embodiments, a project owner, such as a representative of a department of transportation, is able to invoke a "one click" acceptance of a plurality of deliveries of construction materials (the "subset of the delivered construction materials") by providing the user input into the first user interface 255 and, thereby, certify the quantity of the delivered construction material. Once the delivery quantity is so certified, payment to the associated contractor is authorized. Furthermore, since all the delivered construction materials have associated electronic load tickets stored in the second database 212 and respective chains of custody back to respective sources of the construction materials, the certification is traceable to the respective source records of the delivered construction materials.

In some embodiments, the server 215 is configured to use data in the first and second electronic databases 203 and 212 to automatically verify the respective delivered construction material complies with material specification requirements in the project specification data of the associated project. For example, the comparator 230 may automatically verify the delivered construction material complies with material specification requirements in the project specification data of the associated project, as described herein.

In response to a successful verification, the server 215 stores delivery confirmation data for the delivered construction material and the associated contractor. The server 215 is further configured to condition storage of the construction material quantity certification on the delivery confirmation data for corresponding delivered construction material. In other words, the server 215 verifies that the delivered construction materials meet the specifications, and only if the server 215 succeeds in this verification does the server store the construction material quantity certification in response to the user input.

Figure 4:
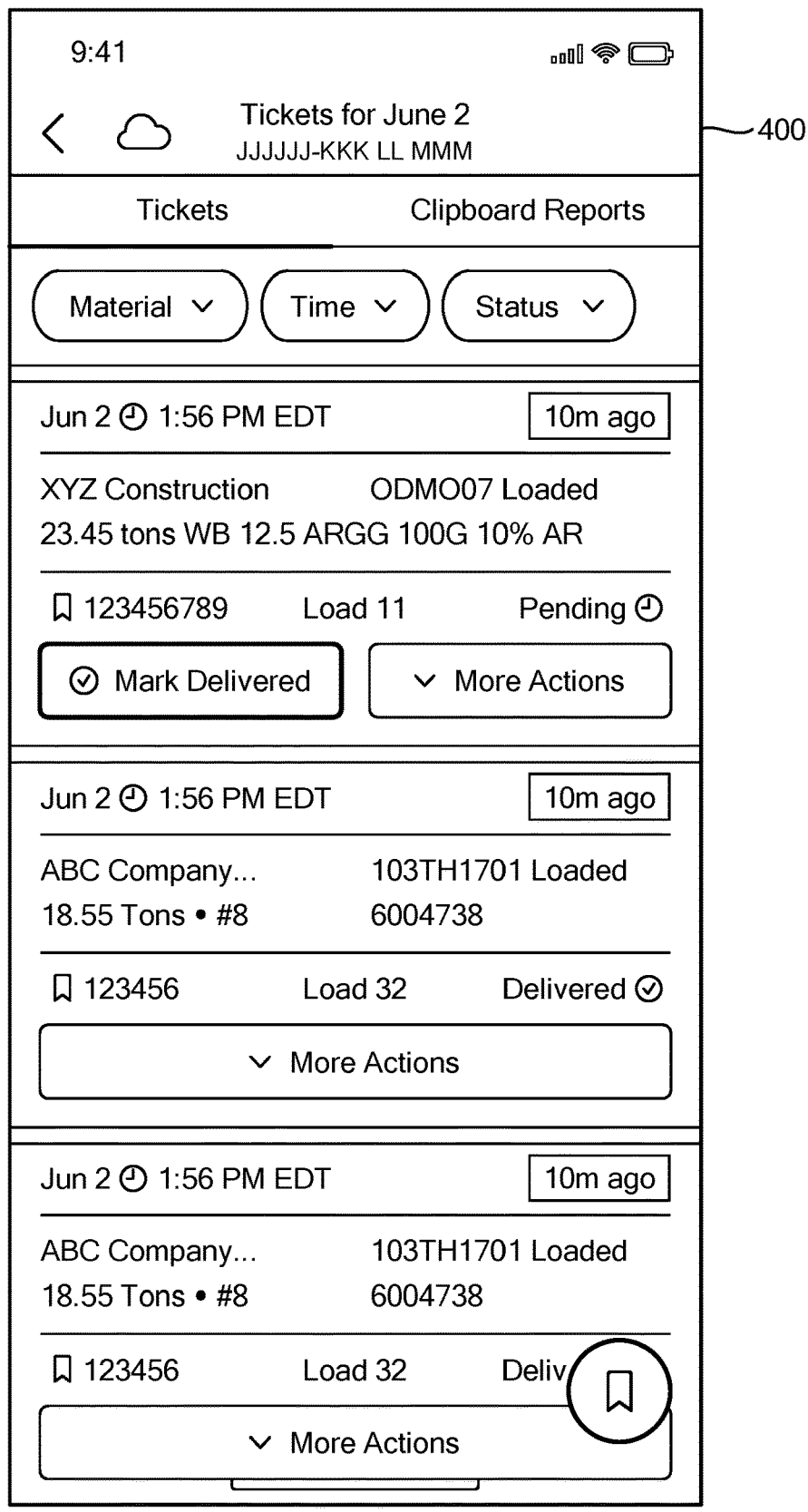
FIG. 4 illustrates an exemplary electronic load ticket displayed on a user interface of the system of FIG. 3, according to an embodiment of the present invention.
Figure 5:
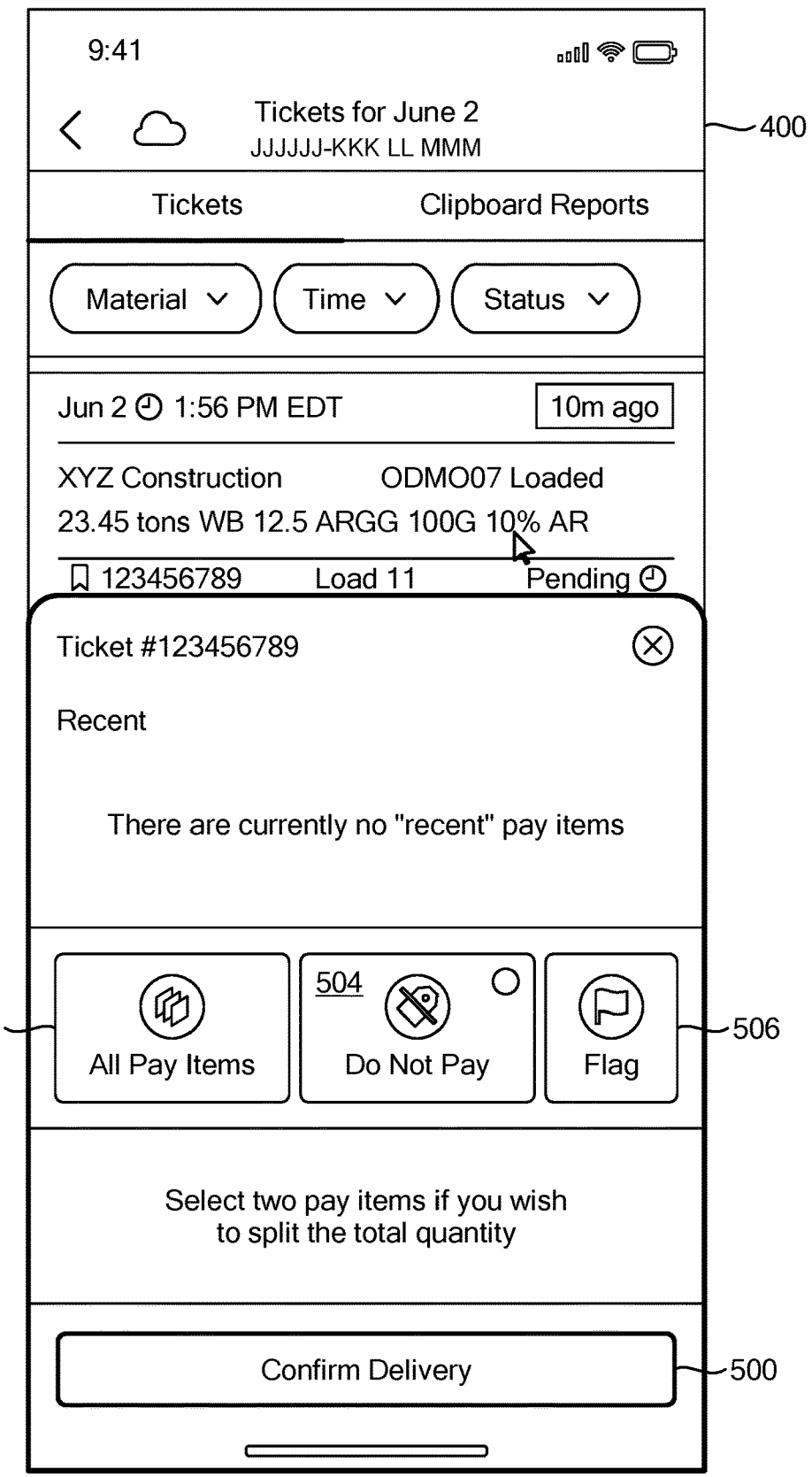
FIG. 5 illustrates an exemplary user interface of the system of FIG. 3 that facilitates a user confirming delivery of corresponding construction material, according to an embodiment of the present invention.

FIG. 4 illustrates an example of an electronic load ticket 400 displayed on the user interface 255, for example to a project owner, such as a department of transportation representative. The example of FIG. 4 is from a mobile phone implementation. Suitable changes in size and layout may be made for different sized and different proportioned screens. FIG. 5 illustrates an example of the user interface 255 facilitating the user confirming delivery of corresponding construction material. Button 500 ("Confirm Delivery") can be activated by the user to certify the quantity of the delivered construction material.

Figure 8:
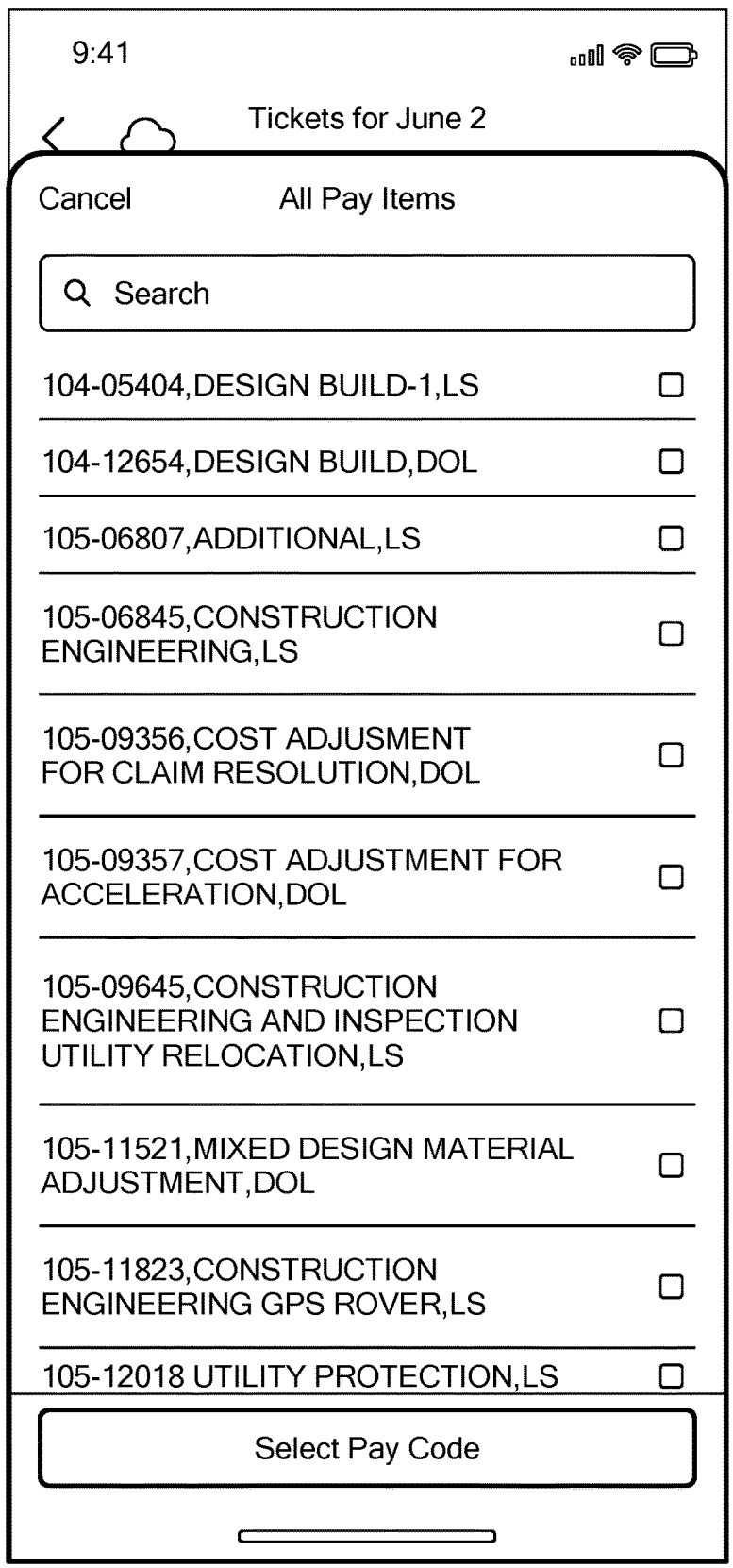
FIG. 8 illustrates an exemplary user interface of the system of FIG. 3 for displaying a list of pay items, according to an embodiment of the present invention.

Optionally or alternatively, the user interface 255 may be used to append information to the electronic load ticket 400. For example, activating button 502 instructs the system to display a list of all pay items (loads of construction material), as illustrated in FIG. 8. Once displayed, the user may instruct actions for ones or groups of the pay items.

Figure 9:
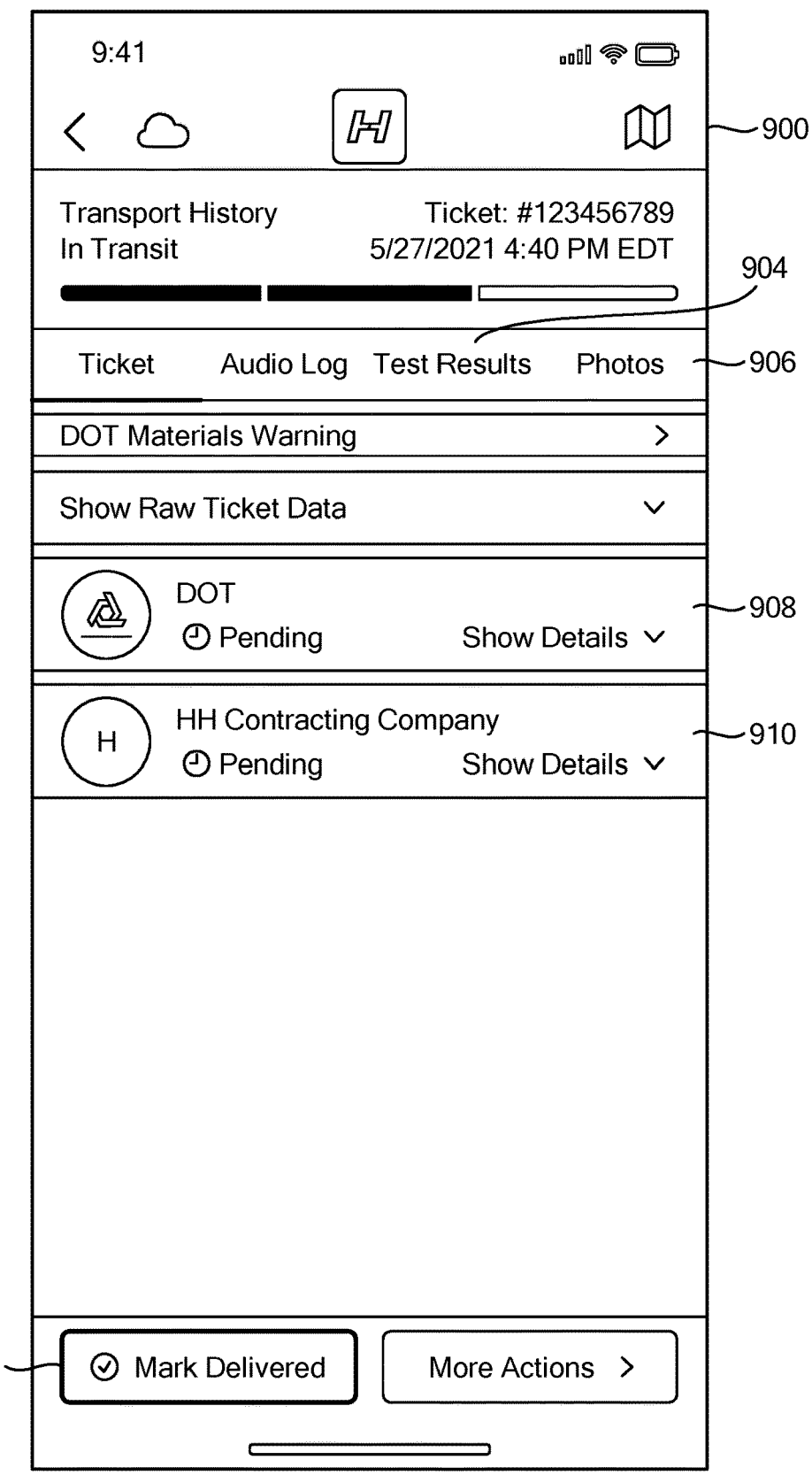
FIG. 9 illustrates a more detailed display of an electronic ticket, including current status, with options to display further user-selected details, according to an embodiment of the present invention.

FIG. 9 illustrates a more detailed display of an electronic ticket 900, including current status, with options to display further user-selected details. For example, an inspector could activate a button 902 to mark a load as having been delivered to a construction site. Button 904 enables a user to append test results to the electronic load ticket, relative to a load of construction material, such as temperature of asphalt. The test results may be obtained from an internal or external instrument, such as an infrared thermometer built into, or attached to, the user's mobile telephone or a temperature probe coupled via a wire or wirelessly to the user's device.

Similarly, button 906 enables the user to append an image, such as an image captured by a digital camera in the user's mobile phone. Collectively, such instruments and cameras are referred to herein as sensors, and data from such sensors is referred to herein as data from a sensor about a delivery of construction material. Thus, a second user interface 255 may be configured to receive data from a sensor about a delivery of construction material. The server 215 may be configured, in response to receipt of the data from the sensor, to automatically store the data from the sensor in the first or second electronic database 203 or 212 and associate the stored data from the sensor to an associated project.

In some cases, a project owner delegates some authority to selected contractors to accept loads of delivered construction material, on behalf of the project owner. Portion 910 of the user interface 255 (when activated) displays actions taken by a delegated party ("HH Contracting Company" in this example) on behalf of the project owner. Portion 908 of the user interface 255 (when activated) displays actions taken by the project owner ("DOT" in this example), so a contractor can see which loads have been accepted and certified.

Returning to FIG. 5, activating button 504 instructs the system to mark a currently selected item for non-payment, for example as a result of poor quality, insufficient quantity, or some other dispute. Activating button 506 instructs the system to flag the currently selected item, so the item can be more easily found later or to mark the electronic ticket 400 for special processing later, such as to split a quantity of construction material between two or more pay items.

Figure 6:
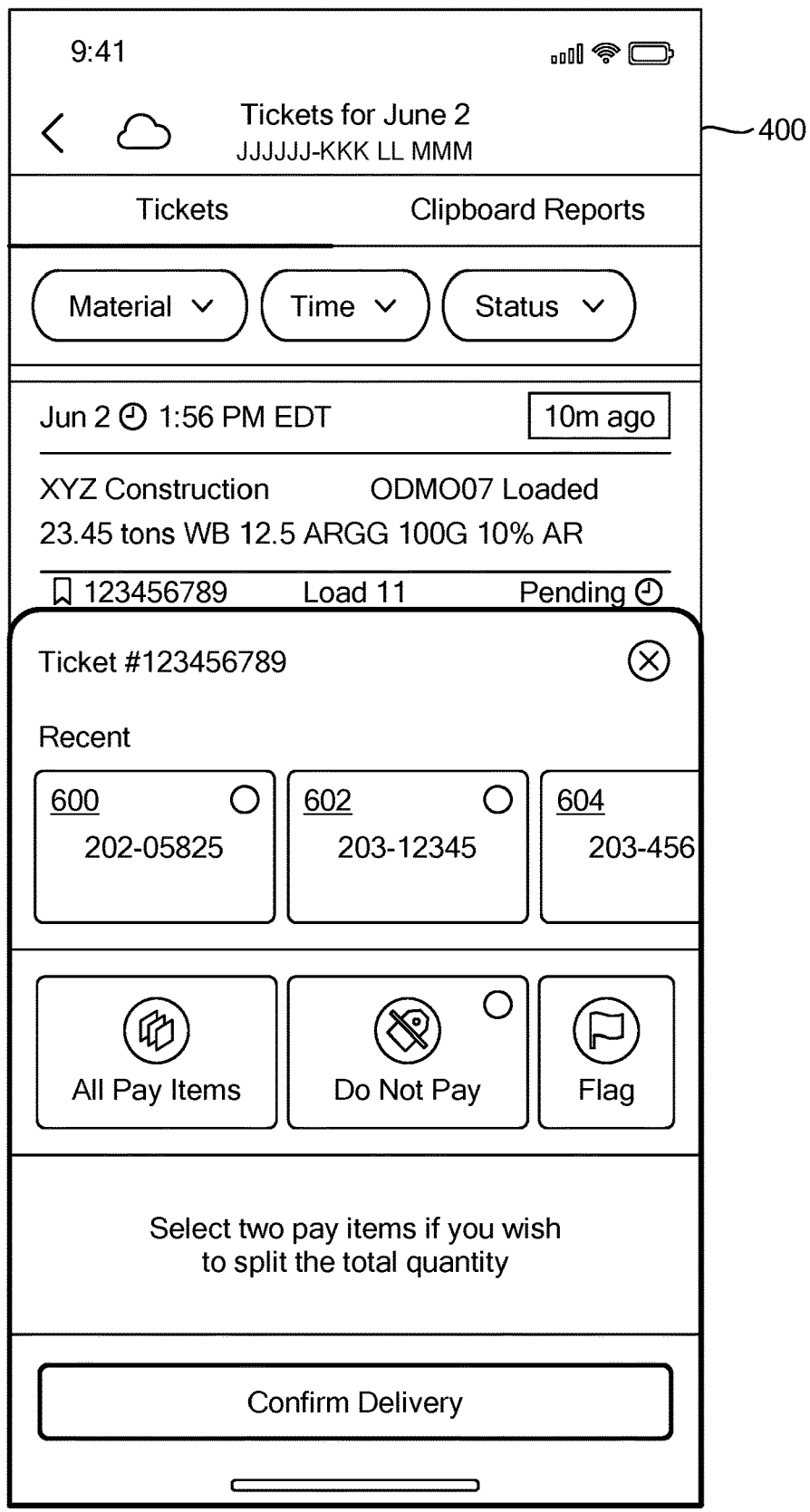
FIG. 6 illustrates an exemplary user interface of the system of FIG. 3 displaying a plurality of pay items, according to an embodiment of the present invention.
Figure 7:
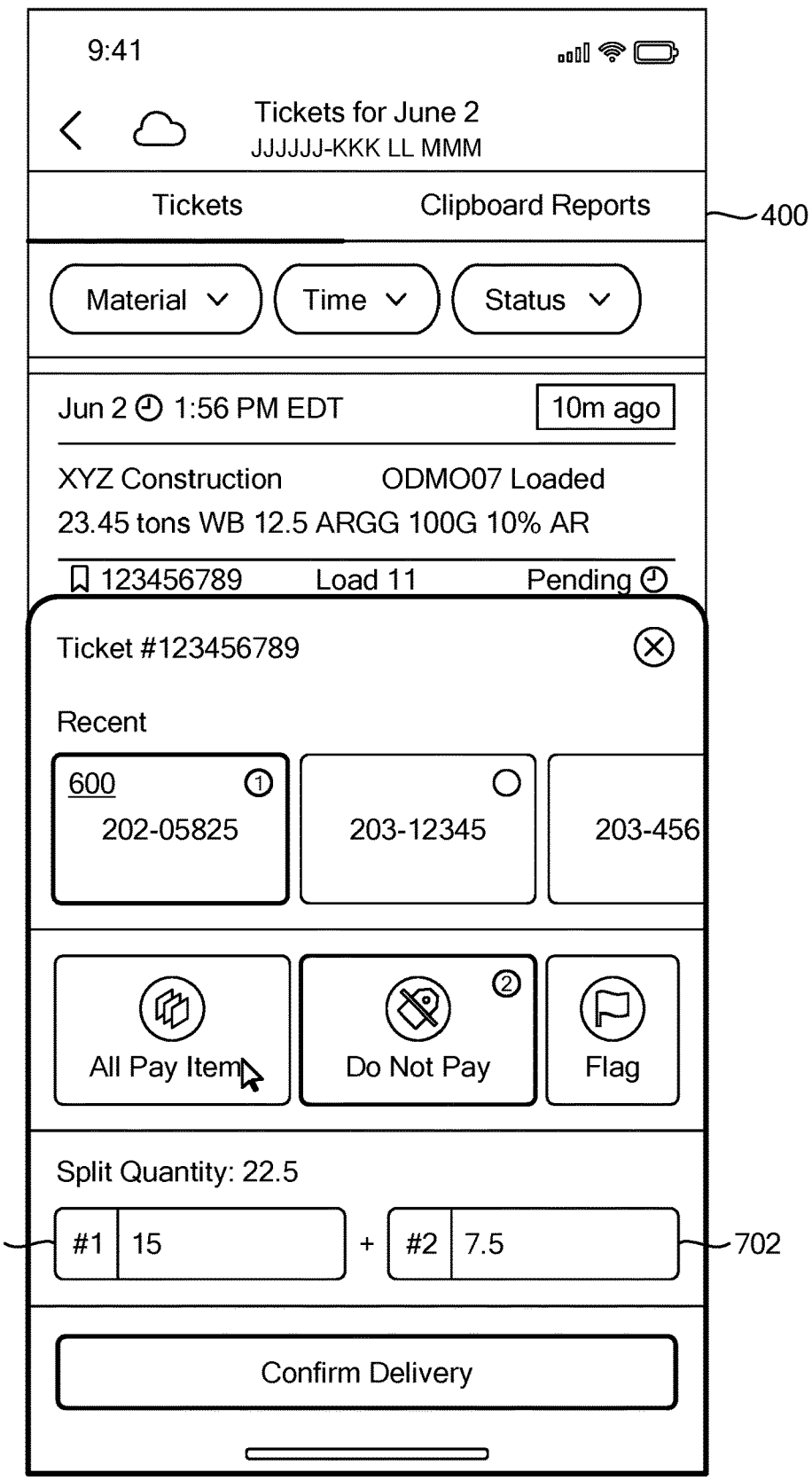
FIG. 7 illustrates an exemplary user interface of the system of FIG. 3, including selecting one pay item and prompts enabling a user to split a quantity between two pay items, according to an embodiment of the present invention.

FIG. 6 illustrates an example of the user interface 255 displaying a plurality of pay items 600, 602, and 604. Clicking on one of the pay items 600-604 causes the user interface 255 to display more information about, or take action with respect to, the respective pay item. For example, as illustrated in FIG. 7, selecting one of the pay items 600 causes the user interface 255 to display prompts enabling the user to split the quantity between two pay items 700 and 702.

Figure 10:
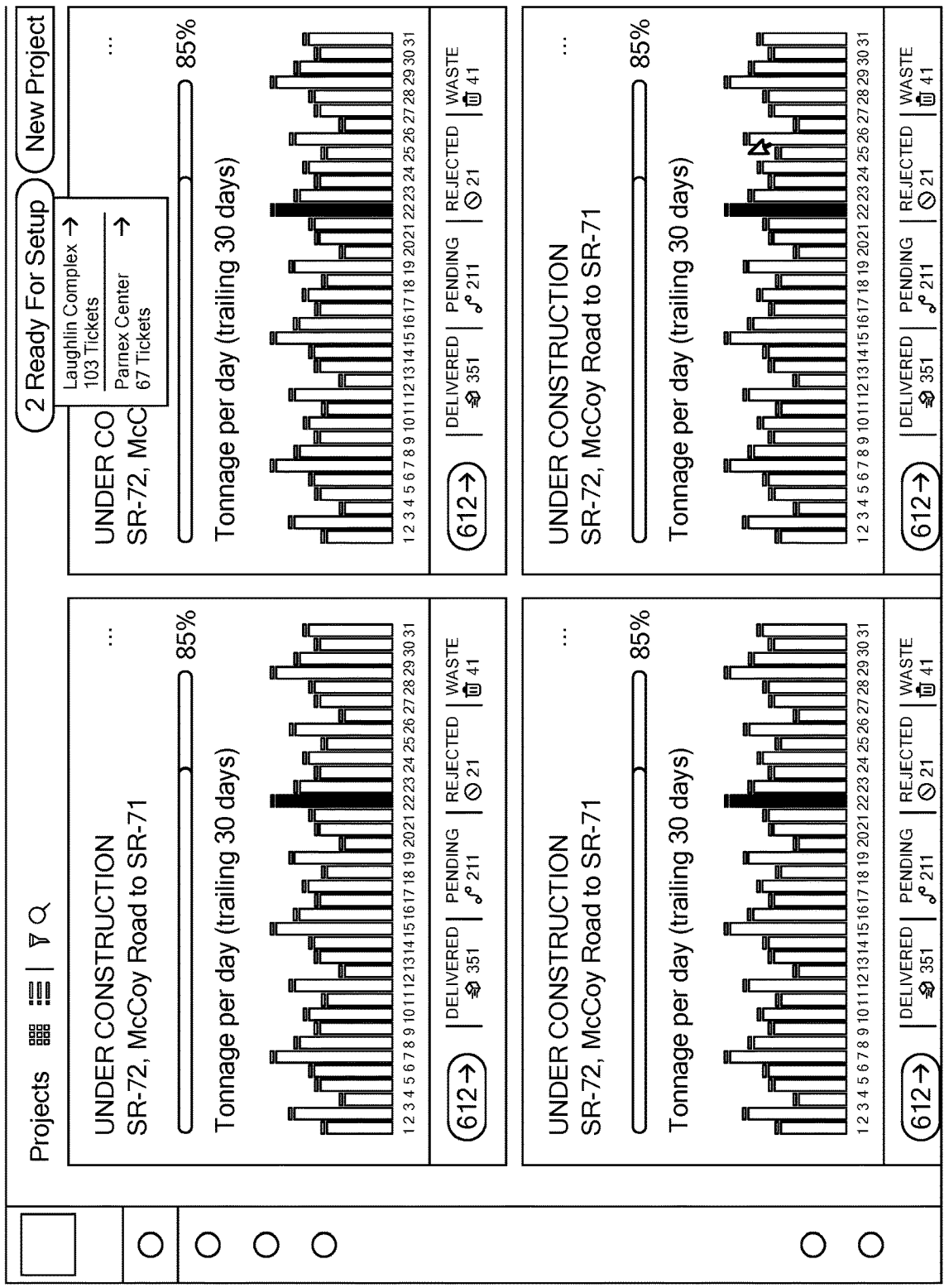
FIG. 10 illustrates a user interface of the system of FIG. 3 that displays status and statistics of a multitude of projects, according to an embodiment of the present invention.

The system may, of course, be used to keep track of multiple projects and/or projects managed by multiple project owners. Storing data for a multitude of projects enables the system to display status and statistics, for example as illustrated in FIG. 10, which may reveal problems or opportunities that would not be obvious, or perhaps even measurable, within a single project.

Figure 11:
FIG. 11 illustrates an exemplary hypothetical user interface of the system of FIG. 3, by which a project owner can select contract items for a project, according to an embodiment of the present invention.
Figure 12:
FIG. 12 illustrates a user interface of the system of FIG. 3, by which the system supports change orders, according to an embodiment of the present invention.

FIG. 11 illustrates an exemplary hypothetical user interface by which a project owner can select contract items for a project. Each contract item is associated with a predefined pay code, typically defined by the department of transportation. Once a project starts, the contract items cannot be changed. However, the system supports change orders, as illustrated in FIG. 12. However, the change orders are relative to originally specified quantities and materials, such as to increase or decrease (including to zero) quantity, or add a new item.

FIG. 13 illustrates an exemplary hypothetical user interface by which pay periods can be established, such as to conform to schedules defined in a contract, or for other purposes. Once a pay period ends, as illustrated in FIG. 14, the system automatically packages all source records and all electronic tickets of the pay period for a possible future audit. To facilitate such an audit, the system may provide a "one click" audit invocation. In such an embodiment, the server 215 is configured, in response to receipt of a user input via the first user interface, to use data in the second database 212 about a subset of the delivered construction materials, and data in the first database 203 about the contractor and the project associated with the subset of the delivered construction materials, to automatically generate and store an audit of the subset of the delivered construction materials.

In some embodiments, the user interface 255 and/or the server 215 stores context information and uses the context information in one or more subsequent transactions. For example, in some embodiments, a user enters credentials, such as a username and password, to gain access to the system, or at least a portion of the system to which the user's function legitimately requires access. The user interface 255 or the server 215 may store information identifying the user, based on the user's entered credentials, and later use the identity information in one or more transactions.

For example, an inspector or weighmaster may log on to the system, and the system may keep track of loads of construction material the inspector inspects or the weighmaster processes. Later, such as at the end of the user's shift, in response to an entry by the inspector or weighmaster via the user interface 255, the system may mark all electronic load tickets that represent all the loads inspected by the inspector or processed by the weighmaster during his/her shift.

Similarly, for a project owner, the system may store context information identifying the user, a project, a plurality of pay items, a plurality of electronic load tickets, etc., and in response to an input from the user, certify delivery of the construction materials represented by the context. Thus, the first user interface or the server may be configured to store first context information about a delivery of a delivered construction material, and the server may be configured to use the first context information and the data in the first and second databases for the delivered construction material and the associated contractor to automatically store the construction material quantity certification.

The first context information may include data about a plurality of quantities of construction materials, and the server may be configured to send the first context information to the first user interface, as the respective quantities of construction materials are obtained from respective suppliers and delivered to respective construction sites. In other words, the context information need not necessarily be originally entered into, or ascertained by, the user's device.

In some embodiments, the first context information includes data identifying a weighmaster, and the server is configured to use the identity of the weighmaster to automatically identify a plurality of deliveries of construction materials that were processed by the weighmaster. For example, the server may automatically identify loads that were processed by the weighmaster, such as by recording times when the weighmaster logged in and logged out of the system, and automatically select loads delivered between those times to a construction site at which the weighmaster logged in. In response to an input from the weighmaster, the system may accept all loads that the weighmaster processed.

The first user interface may be configured to accept a user-entered time range, and the first user interface or the server may be configured to use the user-entered time range to at least partly define the plurality of deliveries of delivered construction materials. For example, the time range may represent a shift, or a group of deliveries to a project, after which an inspector moved to a different project.

The system may include a second user interface configured to receive textual information from a user about a delivery of construction material. As used herein, textual information means alphanumeric entry, including plain text, numerical values, for example temperatures of asphalt. The server may be configured, in response to receipt of the textual information, to automatically store the textual information in the first or second electronic database 203 or 212 and associate the stored textual information to an associated project. Such a user interface facilitates an inspector making notes about a load of received construction material.

As noted, a project owner, such as a department of transportation, may delegate authority to accept loads of construction material, such as to a contractor. In this case, the system may provide an additional user interface, by which the delegee can accept loads. Thus, in some embodiments, the server is configured, in response to receipt of a user input via a third user interface, distinct from the first user interface, to use data in the second database 212 about a subset of the delivered construction materials, and data in the first database 203 about the contractor and the project associated with the subset of the delivered construction materials, to automatically store a construction material quantity certification that is traceable to a plurality of the source records of delivered construction materials.

In some contexts, a contractor may wish to request certification of a plurality of loads of construction material. Essentially, in this context, the contractor asserts that he/she has met contract requirements, and the contractor requests payment therefor. Optionally, the system provides a user interface 255, by which a contractor can make such a request. In response to the request, the system sends a message to the project owner, and in response to receipt of the message, the project owner can then verify the contractor's assertion and, if appropriate, certify the loads. Thus, in such an embodiment, the server 215 is configured, in response to receipt of a user input via a fourth user interface 255, distinct from the first user interface, to automatically generate and send a message requesting construction material quantity certification of the subset of the delivered construction materials.

The server 215 and the databases 203 and 212, as well as some other components described herein, may be stored and/or executed by real or virtual computers in cloud computing services, such as AWS Managed Services provided by Amazon. The server 215 and devices that implement the user interfaces are interconnected via a suitable local or wide-area network, such as the Internet. However, it should be recognized that virtual components, such as virtual servers, virtual network interfaces, virtual networks, virtual network links, virtual memory, etc. are implemented at some level with real hardware components.

In the prior art, certifying a quantity of delivered construction material, such as to authorize payment, is a manual process. In some cases, information from paper load tickets is entered into a spreadsheet to facilitate deciding which items to pay. However, each stakeholder operates with its own version of data. For example, multi-part load tickets are divided among suppliers, truckers, inspectors, contractors, etc. Each stakeholder augments its copy of the load ticket with information relevant to that stakeholder. Consequently, versions of the load ticket and information contained thereon diverge over time. No central database contains a trusted, single source of truth (SSOT). Each stakeholders data replicates some information, leaving open a possibility for discrepancies in the replicated data items.

Embodiments of the present invention do not merely computerize or replicate a manual process. These embodiments provide a single source of truth, regarding project specification data, contractor data, and deliveries of construction materials, including source records and chain of custody data. All stakeholders have access to the same information, although access may be limited based on need to know, access credentials, project, and the like. Furthermore, some embodiments provide "one click" capabilities, such as for an inspector to accept a load or all loads the inspector inspected during a timeframe, or for a project owner to certify a plurality of loads for payment, or for an auditor to audit a plurality of loads or reimbursements.

Embodiments of the present invention are significantly more than mere abstract ideas. Embodiments include physical computer and other components that execute computer programs, and communicate wirelessly, to perform functions described herein. The present invention cannot be implemented or performed within the mind of a human being.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted, so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

While the invention is described through the above-described exemplary embodiments, modifications to, and variations of, the illustrated embodiments may be made without departing from the inventive concepts disclosed herein. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation. All or a portion of each block, module, operation, step or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Figure 3:
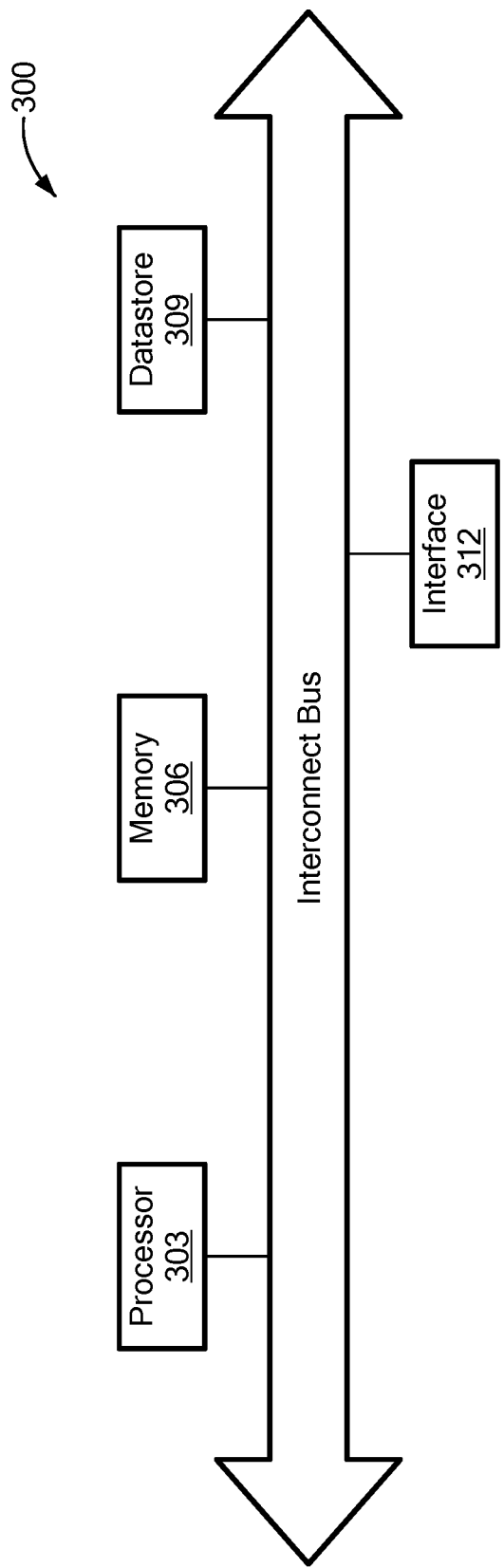
FIG. 3 is a block diagram that schematically illustrates major components of a computer system for implementing a server; inference engine; reconciliation module; first, second, and third interfaces; a comparator; and/or security module of the system of FIG. 2, according to an embodiment of the present invention.

For example, the server 215, inference engine 224, reconciliation module 227, first, second, and third interfaces 206, 233, and 239, the comparator 230, and the security module 242 may be implemented by a suitable processor executing instructions stored in a suitable memory. FIG. 3 is a block diagram that schematically illustrates major components of a computer system 300 that includes such a processor 303 and memory 306, as well as a datastore 309 suitable for storing a database, such as database 203 and/or 212, and an interface 312, such as a human user interface or an interface to another electronic system. Each of these components may be implemented by a separate processor or computer system, or one processor or computer system may implement two or more of these components.

Each processor may be a general-purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), non-volatile memory (NVM), non-volatile random access memory (NVRAM), flash memory or any other memory, or combination thereof, suitable for storing control software or other instructions and data. Instructions defining the functions of the present invention may be delivered to a processor in many forms, including, but not limited to, information permanently stored on tangible non-transitory non-writable storage media (e.g., read-only memory devices within a computer, such as ROM, or devices readable by a computer I/O attachment, such as CD-ROM or DVD disks), information alterably stored on tangible non-transitory writable storage media (e.g., floppy disks, removable flash memory and hard drives) or information conveyed to a computer through a communication medium, including wired or wireless computer networks. Moreover, while embodiments may be described in connection with various illustrative data structures, database schemas and the like, systems may be embodied using a variety of data structures, schemas, etc.

Disclosed aspects, or portions thereof, may be combined in ways not listed herein and/or not explicitly claimed. In addition, embodiments disclosed herein may be suitably practiced, absent any element that is not specifically disclosed herein. For example, an embodiment may include a second and third user interface, without a first user interface. Accordingly, the invention should not be viewed as being limited to the disclosed embodiments.

What is claimed is:

1. A construction material quantity certification system comprising:
a first electronic database configured to store construction project data, including:
project specification data for each of a plurality of projects; and
contractor data for each of a plurality of contractors engaged for ones of the projects;
a second electronic database configured to store data about a plurality of deliveries of construction materials to respective construction sites of respective projects, wherein, for each delivery of a delivered construction material, the second database is configured to store:
an identification of the delivered construction material;
a source record that identifies a source of the delivered construction material; and
chain of custody data about the delivered construction material and extending from the source of the delivered construction material;
a first electronic interface configured to couple to a project owner electronic database and automatically fetch project specification data and contractor data from the project owner database, automatically reformat the fetched project specification data and the fetched contractor data from a closed data format into an open data format, and store reformatted project specification data and reformatted contractor data in the first database;
a second electronic interface to a plurality of devices, each device configured to automatically provide data about respective quantities of construction materials loaded onto, or unloaded from, respective vehicles;
an inference engine configured to use the data about respective quantities of construction materials loaded onto or unloaded from, respective vehicles to automatically infer associations between deliveries of the construction materials and contractors identified in the first electronic database;
a data reconciliation module configured to use information in the first and second databases to automatically infer associations between the deliveries of the construction materials and projects identified in the project specification data of the first electronic database; and a server coupled to the second electronic interface and configured to automatically:
  obtain the data about the respective quantities of construction materials from the plurality of devices;
  store the data about the respective quantities of construction materials in the second database, in association with respective contractors identified by the inference engine and in association with respective projects identified by the data reconciliation module, as the respective quantities of construction materials are obtained from respective suppliers and/or delivered to respective construction sites;
  update the chain of custody data about the delivered construction material; and
  store a construction material quantity certification that is traceable to a plurality of the source records of delivered construction materials, using data in the second database about a subset of the delivered construction materials, and data in the first database about the contractor and the project associated with the subset of the delivered construction materials.

2. The system of claim 1, wherein:
the server is configured to use data in the first and second electronic databases to automatically verify the respective delivered construction material complies with material specification requirements in the project specification data of the associated project and, in response to a successful verification, store delivery confirmation data for the delivered construction material and the associated contractor; and
the server is configured to condition storage of the construction material quantity certification on the delivery confirmation data for corresponding delivered construction material.

3. The system of claim 1, wherein:
a first user interface or the server is configured to store first context information about a delivery of a delivered construction material; and
the server is configured to use the first context information and the data in the first and second databases for the delivered construction material and the associated contractor to automatically store the construction material quantity certification.

4. The system of claim 3, wherein:
the first context information comprises data about a plurality of quantities of construction materials; and
the server is configured to send the first context information to the first user interface, as the respective quantities of construction materials are obtained from respective suppliers and/or delivered to respective construction sites.

5. The system of claim 3, wherein:
the first context information comprises data identifying a weighmaster; and
the server is configured to use the identity of the weighmaster to automatically identify a plurality of deliveries of construction materials that were processed by the weighmaster.

6. The system of claim 1, wherein:
a first user interface or the server is configured to store first context information about a plurality of deliveries of delivered construction materials; and
the server is configured to use the first context information and the data in the first and second databases for the delivered construction material and the associated contractor to automatically store the construction material quantity certification.

7. The system of claim 6, wherein:
the first user interface is configured to accept a user-entered time range; and
the first user interface or the server is configured to use the user-entered time range to at least partly define the plurality of deliveries of delivered construction materials.

8. The system of claim 1, further comprising:
a second user interface configured to receive textual information from a user about a delivery of construction material; and wherein:
the server is configured, in response to receipt of the textual information, to automatically:
  store the textual information in the first or second electronic database; and
  associate the stored textual information to an associated project.

9. The system of claim 1, further comprising:
a second user interface configured to receive data from a sensor about a delivery of construction material; and wherein:
the server is configured, in response to receipt of the data from the sensor, to automatically:
  store the data from the sensor in the first or second electronic database; and
  associate the stored data from the sensor to an associated project.

10. The system of claim 1, wherein the server is configured, in response to receipt of a user input via a third user interface to use data in the second database about a subset of the delivered construction materials, and data in the first database about the contractor and the project associated with the subset of the delivered construction materials, to automatically store a construction material quantity certification that is traceable to a plurality of the source records of delivered construction materials.

11. The system of claim 1, wherein the server is configured, in response to receipt of a user input via a fourth user interface to automatically generate and send a message requesting construction material quantity certification of the subset of the delivered construction materials.

12. The system of claim 1, wherein the server is configured, in response to receipt of a user input via a first user interface, to use data in the second database about a subset of the delivered construction materials, and data in the first database about the contractor and the project associated with the subset of the delivered construction materials, to automatically generate and store an audit of the subset of the delivered construction materials.

13. The system of claim 1, wherein at least one device of the plurality of the devices configured to provide data about respective quantities of construction materials loaded onto, or unloaded from, respective vehicles comprises a system configured to automatically:
  measure effort exerted by a mechanical system to load the construction material; and
  calculate or estimate a quantity of the construction material based at least in part on the effort exerted by the mechanical system.

14. The system of claim 1, wherein at least one device of the plurality of the devices configured to provide data about respective quantities of construction materials loaded onto, or unloaded from, respective vehicles is configured to automatically calculate or estimate a quantity of the construction material based at least in part on a predetermined volume of a bucket of a mechanical construction material loading system.

15. The system of claim 1, wherein at least one device of the plurality of the devices configured to provide data about respective quantities of construction materials loaded onto, or unloaded from, respective vehicles is configured to automatically calculate or estimate a quantify of construction material being laid in a course of pavement.

* * * * *